US012790171B2

(12) United States Patent
Makabe et al.

(10) Patent No.: US 12,790,171 B2
(45) Date of Patent: Nov. 10, 2026

(54) ELEVATOR DEVICE AND ELEVATOR CONTROL DEVICE

(71) Applicant: Mitsubishi Electric Corporation, Tokyo (JP)

(72) Inventors: Ryu Makabe, Tokyo (JP); Atsushi Hori, Tokyo (JP); Masami Aikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 971 days.

(21) Appl. No.: 17/796,271

(22) PCT Filed: Mar. 5, 2020

(86) PCT No.: PCT/JP2020/009361

§ 371 (c)(1),
(2) Date: Jul. 29, 2022

(87) PCT Pub. No.: WO2021/176642

PCT Pub. Date: Sep. 10, 2021

(65) Prior Publication Data

US 2023/0078706 A1 Mar. 16, 2023

(51) Int. Cl.

| | |
|---|---|
| ***B66B 5/00*** | (2006.01) |
| ***B66B 3/00*** | (2006.01) |
| ***G06V 40/16*** | (2022.01) |

(52) U.S. Cl.

CPC .............. *B66B 5/0012* (2013.01); *B66B 3/00* (2013.01); *G06V 40/16* (2022.01)

(58) Field of Classification Search

CPC .......... B66B 5/0012; B66B 2201/4615; B66B 2201/4623; B66B 2201/4653

See application file for complete search history.

(56) References Cited

U.S. PATENT DOCUMENTS

| | | | | |
|---|---|---|---|---|
| 5,780,787 A * | 7/1998 | Kamani | ................ | B66B 13/143 187/390 |
| 6,339,375 B1 * | 1/2002 | Hirata | ...................... | G01V 8/10 340/541 |

(Continued)

FOREIGN PATENT DOCUMENTS

| | | |
|---|---|---|
| CN | 103010883 A | 4/2013 |
| EP | 2295361 A1 | 3/2011 |

(Continued)

OTHER PUBLICATIONS

Korean Office Action issued Jun. 25, 2024, in corresponding Korean Patent Application No. 10-2022-7029848, 15pp.

(Continued)

*Primary Examiner* — Rina I Duda

(74) *Attorney, Agent, or Firm* — XSENSUS LLP

(57) ABSTRACT

An elevator device according to this disclosure includes a detection device, an identification module, and a determination module. The detection device is provided to a car of an elevator, and detects detection information. The identification module repeatedly acquires identification information for identifying a passenger from the detection information detected by the detection device. The determination module determines a leaving floor of the passenger based on a change in the identification information acquired by the identification module and a floor on which the car stops.

19 Claims, 25 Drawing Sheets

(56) References Cited

U.S. PATENT DOCUMENTS

| | | | | |
|---|---|---|---|---|
| 8,464,840 | B2 * | 6/2013 | Flynn | B66B 5/0012 187/391 |
| 8,857,569 | B2 * | 10/2014 | Friedli | B66B 5/0012 187/392 |
| 8,886,390 | B2 * | 11/2014 | Wolfe | G05B 19/41895 701/1 |
| 8,958,910 | B2 * | 2/2015 | Ichinose | B66B 1/2458 700/258 |
| 9,238,568 | B2 * | 1/2016 | Nonami | B66B 1/468 |
| 10,189,677 | B2 * | 1/2019 | Bryant | G06V 40/172 |
| 2006/0180404 | A1 * | 8/2006 | Christen | B66B 13/08 187/315 |
| 2010/0006379 | A1 | 1/2010 | Hamaji | |
| 2015/0314983 | A1 * | 11/2015 | Saari | B66B 3/006 187/382 |
| 2016/0083218 | A1 * | 3/2016 | Vuorenala | B66B 3/006 187/383 |
| 2019/0002234 | A1 * | 1/2019 | Shinohe | B66B 1/3446 |

FOREIGN PATENT DOCUMENTS

| | | | |
|---|---|---|---|
| JP | 2006-56678 | A | 3/2006 |
| JP | 2012-224423 | A | 11/2012 |
| JP | 2013-095595 | A | 5/2013 |
| JP | 2016-38774 | A | 3/2016 |
| KR | 10-2000-0004874 | A | 1/2000 |
| WO | 2008/050416 | A1 | 5/2008 |
| WO | 2010/004607 | A1 | 1/2010 |
| WO | 2016/103352 | A1 | 6/2016 |
| WO | 2018/037534 | A1 | 3/2018 |
| WO | 2019/087251 | A1 | 5/2019 |

OTHER PUBLICATIONS

Office Action issued on Dec. 1, 2022, in corresponding Indian patent Application No. 202247046802, 7 pages.

International Search Report and Written Opinion mailed on May 12, 2020, received for PCT Application PCT/JP2020/009361, filed on Mar. 5, 2020, 9 pages including English Translation.

* cited by examiner

FIG. 3

10

| STATE No. (10a) | DEPARTURE FLOOR (10b) | IDENTIFICATION INFORMATION (10c) | TRAVEL DIRECTION (10d) |
|---|---|---|---|
| 001 | 1F | - | UPWARD |
| 002 | 2F | A,B | UPWARD |
| 003 | 3F | A,B,C | UPWARD |
| 004 | 5F | A,D | UPWARD |
| 005 | 6F | - | DOWNWARD |
| ⋮ | | | |
| X | *F | ** | ** |

FIG. 6

11

| CONFIRMATION No. (11a) | LEAVING FLOOR (11b) | PASSENGER (11c) | TRAVEL DIRECTION IMMEDIATELY BEFORE (11d) |
|---|---|---|---|
| 001 | 2F | - | UPWARD |
| 002 | 3F | - | UPWARD |
| 003 | 5F | B,C | UPWARD |
| 004 | 6F | A,D | UPWARD |
| ⋮ | | | |
| Y | *F | ** | ** |

FIG. 7

12

| PASSENGER | 1F | 2F | 3F | 4F | 5F | 6F |
|---|---|---|---|---|---|---|
| A | 0 | 5 | 50 | 30 | 100 | 27 |
| B | 0 | 8 | 123 | 40 | 50 | 7 |
| C | 0 | 25 | 6 | 70 | 37 | 52 |
| D | 0 | 6 | 5 | 60 | 98 | 19 |

13 (boxed values: 100, 123, 70, 98)

FIG.11

19

| CONFIRMATION No. (11a) | LEAVING FLOOR (11b) | BOARDING/LEAVING (11e) |
|---|---|---|
| 001 | 2F | - |
| 002 | 3F | - |
| 003 | 5F | B(2F),C(3F) |
| 004 | 6F | A(2F),D(5F) |
| ⋮ | ⋮ | ⋮ |
| Y | *F | ** |

FIG.13

14

| CORRESPONDENCE NUMBER (14a) | FACE INFORMATION (14b) | FEATURE INFORMATION (14c) |
|---|---|---|
| 001 | A | RED |
| 002 | B | GREEN |
| 003 | C | BLUE |
| 004 | D | YELLOW |
| ⋮ | | |

FIG.15

20

| CORRESPONDENCE No. (14a) | FACE INFORMATION (14b) | COORDINATE INFORMATION (14d) |
|---|---|---|
| 001 | A | (4. 2)... |
| 002 | B | (8. 7)... |
| 003 | C | (9. 4)... |
| 004 | D | (5. 5)... |
| | ⋮ | |

FIG.20

FIRST FLOOR → SECOND FLOOR

15

| IDENTIFICATION INFORMATION | FLOOR INFORMATION |
|---|---|
| A | 2 |
| B | 2 |
| | |

FIG.21

SECOND FLOOR → THIRD FLOOR

15

| IDENTIFICATION INFORMATION | FLOOR INFORMATION |
|---|---|
| A | 2 |
| B | 3 |
| C | 3 |

FIG.22

THIRD FLOOR → FOURTH FLOOR

15

| IDENTIFICATION INFORMATION | FLOOR INFORMATION |
|---|---|
| A | 2 |
| B | 3 |
| C | 4 |

ELEVATOR DEVICE AND ELEVATOR CONTROL DEVICE

CROSS-REFERENCE TO RELATED APPLICATION

The present application is based on PCT filing PCT/JP2020/009361, filed Mar. 5, 2020, the entire contents of which are incorporated herein by reference.

TECHNICAL FIELD

This disclosure relates to an elevator device and an elevator control device.

BACKGROUND ART

In Patent Literature 1, there is disclosed an elevator system which uses a portable information processing device of an elevator user to store a use history of an elevator. In this elevator system, the portable information processing device is detected by a hall-side user detection device and a car-side user detection device, to thereby store the use history of the elevator including leaving floors of the users.

CITATION LIST

Patent Literature

[PTL 1] JP 2006-56678 A

SUMMARY OF INVENTION

Technical Problem

In the above-mentioned elevator system, the user detection devices installed at a plurality of halls detect a passenger, to thereby determine leaving floors of the passenger. Accordingly, there is a problem in that the user detection devices are required to be installed at all of halls, respectively.

This disclosure has been made in view of the above-mentioned problem, and has an object to provide an elevator device and an elevator control device which use, in the elevator device, detection devices fewer than those of the related art to determine leaving floor at which a user leaves an elevator.

Solution to Problem

According to one embodiment of this disclosure, there is provided an elevator device, including: a detection device provided to a car of an elevator; an identification module configured to repeatedly acquire identification information for identifying a passenger from detection information detected by the detection device; and a determination module configured to determine a leaving floor of the passenger based on a change in the identification information acquired by the identification module and a floor on which the car stops.

Further, according to one embodiment of this disclosure, there is provided an elevator control device, including: an identification module configured to repeatedly acquire identification information for identifying a passenger from detection information on an inside of a car of an elevator detected by a detection device provided to the car; and a determination module configured to determine a leaving floor of the passenger based on a change in the identification information acquired by the identification module and a floor on which the car stops.

Advantageous Effects of Invention

According to this disclosure, in the elevator device, the detection devices fewer than those of the related art are used to be capable of determining the leaving floor of the passenger.

BRIEF DESCRIPTION OF DRAWINGS

FIG. 3 is a table for showing information in a database which stores state information on the elevator device according to the first embodiment.

FIG. 6 is a table for showing information in a database which stores the confirmation information on the elevator device according to the first embodiment.

FIG. 7 is a table for showing information in a database which stores summary information on the elevator device according to the first embodiment.

FIG. 11 is a table for showing the information in the database which stores the confirmation information on the elevator device according to a second embodiment of this disclosure.

FIG. 13 is a table for showing information in a database which stores a correspondence table of the elevator device according to the third embodiment.

FIG. 15 is a table for showing the information in the database which stores the correspondence table of the elevator device according to the third embodiment.

FIG. 20 is a table for showing temporary information at the time when a car of the elevator device according to a sixth embodiment of this disclosure travels from a first floor to a second floor.

FIG. 21 is a table for showing the temporary information at the time when the car of the elevator device according to the sixth embodiment travels from the second floor to a third floor.

FIG. 22 is a table for showing the temporary information at the time when the car of the elevator device according to the sixth embodiment travels from the third floor to a fourth floor.

DESCRIPTION OF EMBODIMENTS

First Embodiment

Figure 1:
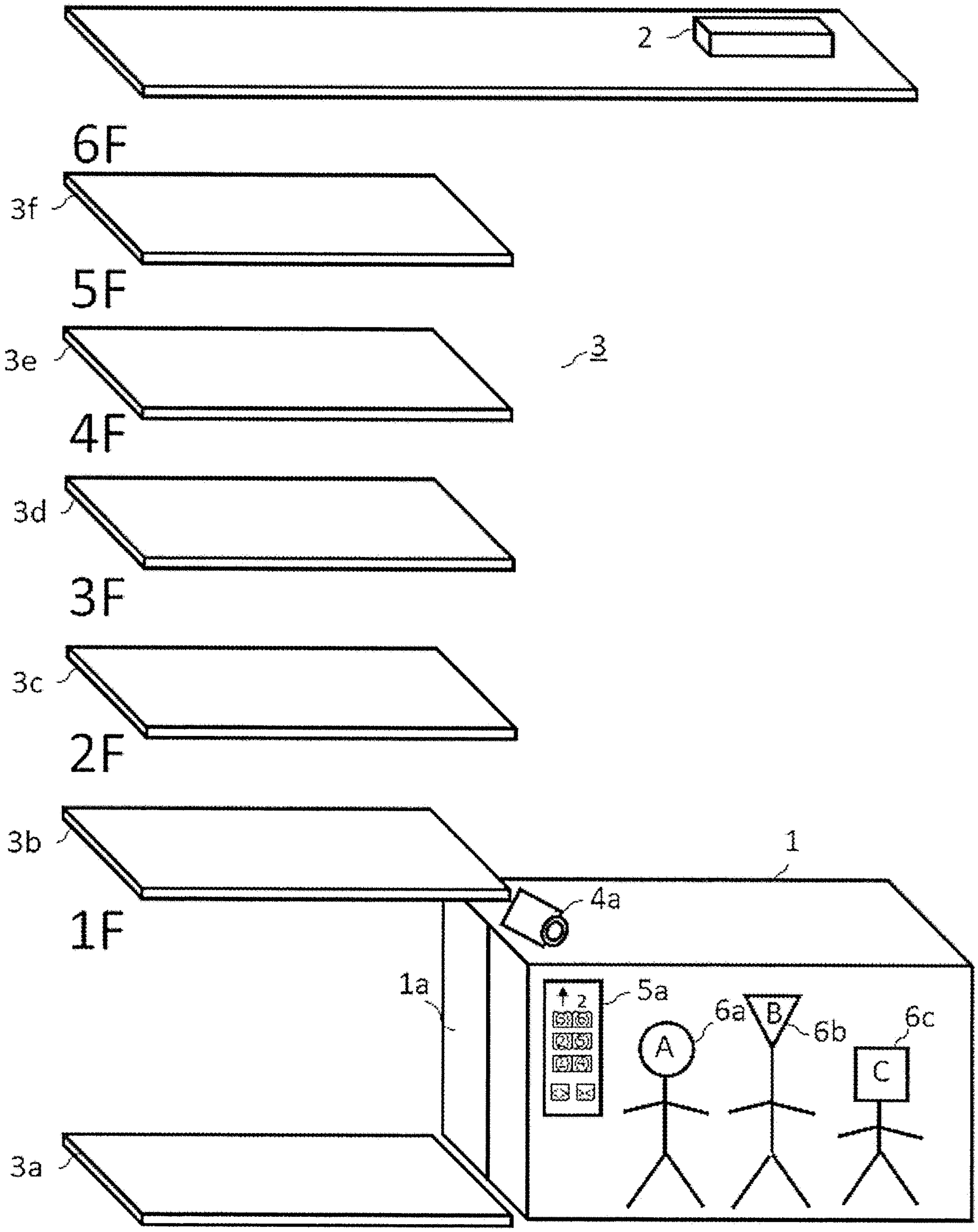
FIG. 1 is a diagram for illustrating an elevator device according to a first embodiment of this disclosure.

With reference to drawings, a detailed description is now given of an elevator device according to a first embodiment of this disclosure. The same reference symbols in the drawings denote the same or corresponding configurations or steps.

FIG. 1 is a diagram for illustrating the elevator device according to the first embodiment. First, with reference to FIG. 1, the entire elevator device is described.

This elevator device includes a car 1, an elevator control device 2, an imaging device 4*a* being a detection device 4, and a button-type destination navigation device 5*a* being a display device 5, and is installed in a building having floors 3 from a first floor 3*a* to a sixth floor 3*f*. Moreover, the car 1 includes a door 1*a*. In FIG. 1, in the car 1 for accommodating persons, three passengers 6 including a passenger A 6*a*, a passenger B 6*b*, and a passenger C 6*c* are aboard, and the car 1 stops on the first floor 3*a*.

According to this embodiment, the elevator control device 2 uses the imaging device 4*a* to determine the passengers 6 on each floor 3. Thus, unlike the related art, it is not required to provide detection devices 4 at all of halls, and hence it is possible to determine leaving floors on which the passengers 6 leave using a fewer number of detection devices 4. Moreover, the elevator control device 2 uses the determined information on the leaving to be capable of predicting a candidate of a destination floor of each passenger 6, and displaying the candidate on the button-type destination navigation device 5*a*.

Figure 2:
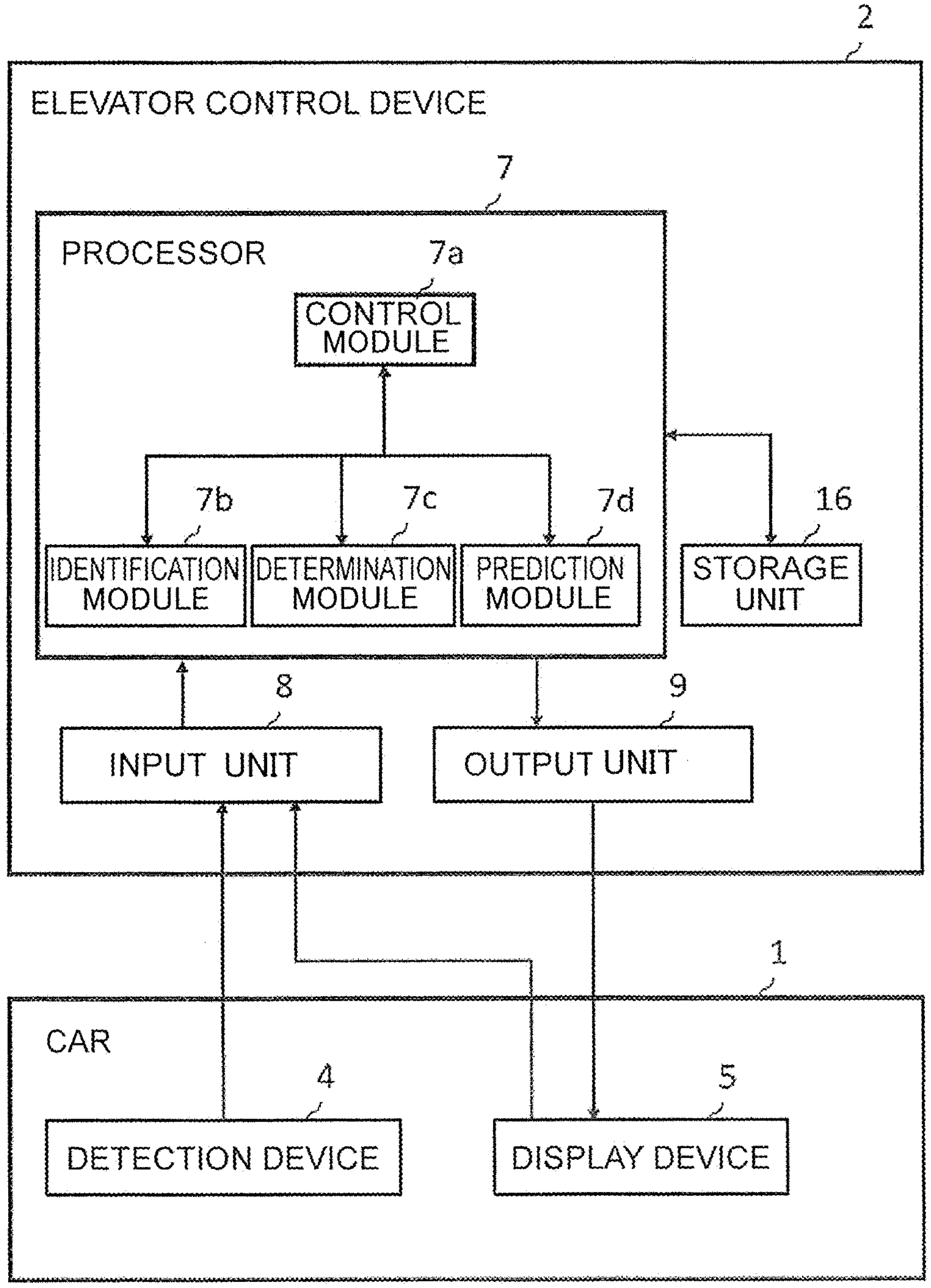
FIG. 2 is a configuration diagram of the elevator device according to the first embodiment.

With reference to FIG. 2, a detailed description is now given of a configuration of the elevator control device 2. The elevator control device 2 includes a processor 7, an input unit 8, an output unit 9, and a storage unit 16. The processor 7 executes control. The output unit 9 outputs a command from the processor 7. The storage unit 16 stores information.

The processor 7 is a central processing unit (CPU), and is connected to the input unit 8, the output unit 9, and the storage unit 16 for communicating information. The processor 7 includes a control module 7*a*, an identification module 7*b*, a determination module 7*c*, and a prediction module 7*d*.

The control module 7*a* includes a software module configured to control the identification module 7*b*, the determination module 7*c*, and the prediction module 7*d*, and to control the entire elevator device.

The identification module 7*b* includes a software module configured to acquire identification information for identifying the passengers 6 from detection information detected by the detection device 4 described later. In this embodiment, the acquisition of the identification information means extracting face information on the passenger 6 being feature information from image information taken by the imaging device 4*a*, collating the extracted face information with another face information stored in a temporary storage destination of the storage unit 16 through two-dimensional face recognition, and storing, as identification information, the face information determined to be newly extracted as a result of the face recognition in the temporary storage destination of the storage unit 16. In this disclosure, the face information is information on positions of feature points such as eyes, a nose, a mouth, and the like of a face.

The determination module 7*c* includes a software module configured to determine a leaving floor of each passenger 6 from a change in identification information 10*c* between two successive states and departure floor information 10*b* stored in a state information database 10 described later.

The prediction module 7*d* includes a software module configured to predict a candidate floor 13 being a candidate of a destination floor from a summary information database 12 described later.

The input unit 8 is an input interface including terminals to which electric wires (not shown) connected to the detection device 4 and the display device 5 are connected. Moreover, the input unit 8 also includes terminals to which electric wires connected to a drive device (not shown) configured to open and close the door 1*a* of the car 1 and move the car 1 is connected.

The output unit 9 is an output interface including terminals to which an electric wire (not shown) connected to the display device 5 is connected. Moreover, the output unit 9 also includes terminals to which electric wires connected to the drive device (not shown) configured to open and close the door 1*a* of the car 1 and move the car 1 is connected.

The storage unit 16 is a storage device formed of a nonvolatile memory and a volatile memory. The nonvolatile memory stores the state information database 10, a confirmation information database 11, and the summary information database 12, which are described later. The volatile memory temporarily stores information generated by processing of the processor 7 and information input from the imaging device 4*a* and the button-type destination navigation device 5*a* to the elevator control device 2. Moreover, this temporarily stored information may be stored in the nonvolatile memory.

With reference to FIG. 1, description is now given of other configurations of the elevator device. The imaging device 4*a* being the detection device 4 is a camera installed in an upper portion on the door 1*a* side of the car 1 so that the camera faces forward as viewed from the door 1*a* toward the inside of the car 1. The imaging device 4*a* continuously takes images of a state inside the car 1, and transmits the taken video to the elevator control device 2.

The button-type destination navigation device 5*a* is an output device for transmitting information to the passenger 6, and displays the candidate floor 13 having been predicted by the prediction module 7*d* and then output by the output unit 9. Moreover, the button-type destination navigation device 5*a* also functions as an input device when the passenger 6 registers a destination floor.

With reference to FIG. 3, description is now given of information stored in the state information database 10. The state information database 10 is a database for storing state information including the identification information acquired by the identification module 7*b* for each state of the car 1. In this disclosure, each state means, when the car 1 travels from a certain floor 3 to another floor 3, each state in the car 1 from door closing on the certain floor 3 to door opening on the another floor 3. That is, one piece of state information includes information on a travel of the car 1 and identification information acquired in a state from the door closing to the door opening including the travel without the boarding and the leaving of the passengers 6.

More specifically, the state information database 10 is a database including a state number 10*a*, the departure floor information 10*b*, the identification information 10*c*, and travel direction information 10*d* for each state. The state number 10*a* is a serial number of each state. The departure floor information 10*b* indicates a floor 3 from which the car 1 starts the travel in each state. The identification information 10*c* is identification information acquired from the passengers 6 aboard the car 1 in each state. The travel direction information 10*d* indicates a travel direction of the car 1 in each state. The state information database 10 is added by the identification module 7*b*. State information having X as the state number 10*a* is hereinafter referred to as "state X."

FIG. 3 shows that information acquired in a period from the door closing to the door opening including a first travel of the car 1 is considered as a state 001, and the car 1 starts a travel toward an upward direction from the first floor 3*a* without passengers 6 in the state 001. Moreover, a state 002 indicates that the car 1 starts a travel toward the upward direction from the second floor 3*b* while the passenger A 6*a* having identification information "A" and the passenger B 6*b* having identification information "B" are aboard. In this embodiment, the identification information is face information, and hence each of "A" and "B" denotes a combination of a plurality of pieces of face information obtained from a specific passenger 6. Moreover, a state 003 indicates that the passenger C 6*c* having identification information "C" starts a travel toward the upward direction from the third floor 3*c* in addition to the passenger A 6*a* having the identification information "A" and the passenger B 6*b* having the identification information "B" who have been aboard from the state 002. Further, a state 004 indicates that a passenger having identification information "D" who is not aboard the car 1 in the state 003 newly gets aboard. Moreover, there is shown that the passenger B 6*b* having the identification information "B" and the passenger C 6*c* having the identification information "C" aboard the car 1 in the state 003 are not aboard the car 1 in the state 004. From this, it is appreciated, through only the change in the identification information acquired from the image information detected by the imaging device 4*a*, that the passenger B 6*b* having the identification information "B" and the passenger C 6*c* having the identification information "C" leave on the fifth floor 3*e*, which is a departure floor in the state 004.

Figure 4:
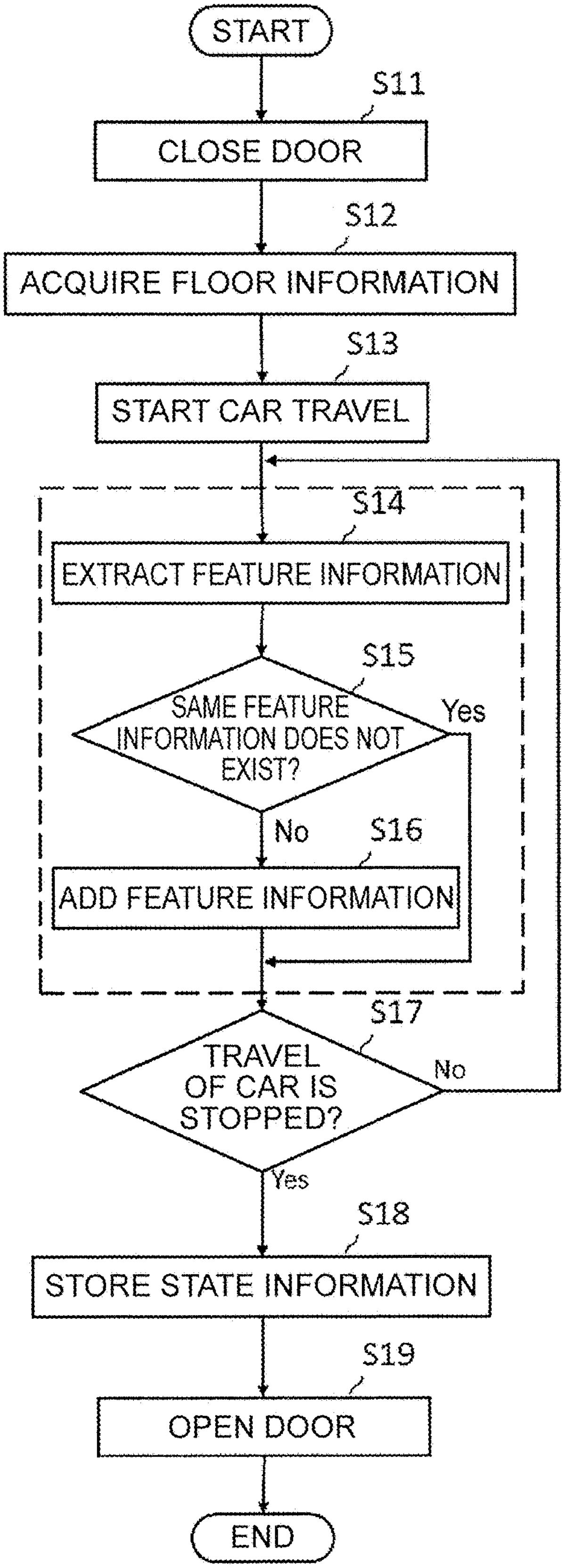
FIG. 4 is a flowchart for illustrating control at the time when the state information on the elevator device according to the first embodiment is stored.

With reference to FIG. 4 to FIG. 10, an operation in this embodiment is now described. FIG. 4 is a flowchart for illustrating control for the elevator device when the information on the inside of the car 1 is acquired.

In this embodiment, the imaging device 4*a* continuously takes images of the inside of the car 1, and transmits the taken video to the elevator control device 2.

In Step S11, the control module 7*a* outputs a command for closing the door 1*a* of the car 1 from the output unit 9 to the drive device, and the processing proceeds to Step S12 when the door closing is completed. In Step S12, the control module 7*a* stores floor information on a floor 3 on which the car 1 is stopping in the temporary storage destination of the storage unit 16. After that, in Step S13, the control module 7*a* outputs a command from the output unit 9 to the drive device, to thereby start the travel of the car 1, and the processing proceeds to Step S14.

In Step S14, the control module 7*a* causes the identification module 7*b* to extract the identification information. The identification module 7*b* acquires the image information taken by the imaging device 4*a* and stored in the storage unit 16 through the input unit 8, and extracts, from the image information, as the feature information, the face information being the information on the feature points of the face of each passenger 6.

Specifically, the identification module 7*b* applies the Sobel filter to the acquired image information to execute edge pixel detection, to thereby calculate feature quantities such as a brightness distribution of edge pixels. A partial image having the feature quantity satisfying a predetermined condition which is satisfied when the partial image corresponds to a face of a person stored in advance in the storage unit 16 is detected as a partial image indicating the face of the person. After that, a plurality of reference face images stored in advance in the storage unit 16 are used to extract feature points of the passenger 6 being the face information from the detected partial image. That is, a position having the minimum difference from an image feature such as a brightness value or a hue value at the feature point (for example, in a case of the eye, an inner corner of the eye, an upper end of the eye, a lower end of the eye, or an outer corner of the eye) set in advance to the reference face image is specified from the detected partial image. This specification is executed for a plurality of reference face images in accordance with a positional relationship (for example, the outer corner of the eye is located on an outside with respect to the inner corner of the eye) among the feature points. After that, a position having the minimum sum of the differences for the plurality of reference face images is set as a position of the feature point of the detected partial image. The image features such as the brightness value and the hue value, which are information on the feature point in this state, and relative distances to other feature points are acquired as the face image. It is preferred that the feature points be extracted after preprocessing of correcting a difference in an angle of taking an image of the face is applied to the partial image indicating the face of a person. Moreover, the extraction of the feature information may be executed by a method other than the above-mentioned method as long as the information can be extracted from the image. For example, preprocessing of converting the face image to a face image as viewed from the front side may be applied, and the image after the conversion may be input to a learned model for machine learning, to thereby extract the feature information. As a result, the extraction of the feature information resistant against the change in the angle of taking an image of the face can be achieved.

The image information transmitted by the imaging device 4*a* may be compressed image information, such as Motion JPEG, AVC, and HEVC, or non-compressed image information. When the transmitted image information is compressed image information, the processor 7 uses a publicly known decoder to restore an original image from the compressed image to use the original image for the extraction of the face information.

After that, in Step S15, the identification module 7*b* accesses the storage unit 16, and collates the face information extracted in Step S14 to the face information stored in the temporary storage destination of the storage unit 16, to thereby determine whether or not the extracted face information has already been extracted. The collation is executed through two-dimensional face recognition. When it is determined that the same face information is not stored in the temporary storage destination as a result of the collation, it is determined that the face information is extracted for the first time, and the processing proceeds to Step S16. When it is determined that the same face information is stored, it is determined that the face information has already been extracted, and the processing proceeds to Step S17. That is, when face information having a similarity to the face information extracted in Step S14 equal to or higher than a threshold value is stored in the temporary storage destination, the processing proceeds to Step S17. This threshold value for the similarity can experimentally be determined through use of an image taken when a plurality of persons are aboard the car or the like. For example, in order to prevent a state in which another passenger 6 is determined as the same person, resulting in omission of the detection of this passenger 6, a high similarity is set as the threshold value. Meanwhile, when it is intended to reduce a possibility that the same passenger 6 is detected as another person, a low similarity is set as the threshold value. Moreover, as another method, a learned model for the machine learning may be used to determine whether or not the face information is the same. It is possible to highly accurately determine whether two images or two feature quantities to be compared with each other are from the same person by using a plurality of images of the same person different in angle of taking an image, facial expression, and brightness such as that of illumination or feature quantities extracted therefrom to execute supervised learning.

Moreover, the identification module 7*b* may specify the number of passengers 6 in the car 1, and when the number of pieces of the face information stored in the temporary storage destination reaches the number of passengers 6 in the car 1, the processing may proceed to Step S18.

In Step S16, the identification module 7*b* stores the face information acquired in Step S14 in the temporary storage destination of the storage unit 16. After that, the processing proceeds to Step S17. When the car 1 does not stop, the processing returns to Step S14, and processing is repeated for the partial image of the face of another passenger 6, or an image of a next image frame. When the car 1 stops, the processing proceeds to Step S18. That is, the face information extracted even once during the travel of the car 1 is stored in the temporary storage destination by repeating Step S14 to Step S17.

After the car 1 stops, the identification module 7*b* stores the state information in the state information database 10 in Step S18, and deletes the information in the temporary storage destination. Specifically, state information having a number larger by one than the maximum state number 10*a* is created. After that, the information on the floor 3 stored in the temporary storage destination in Step S12 is stored as the departure floor information 10*b* in the newly created state information, and the state information is stored in the state information database 10. Further, the identification module 7*b* specifies the face information on one or a plurality of passengers 6 stored in the temporary storage destination as the identification information 10*c* corresponding to the passenger 6 in Step S16, respectively, and stores the specified identification information 10*c* in the state information database 10. Moreover, the identification module 7*b* stores, as the travel direction information 10*d*, the travel direction of the car 1 from Step S13 to Step S17. When the storage in the state information database 10 is completed as described above, the information in the temporary storage destination is deleted. After that, in Step S19, the control module 7*a* outputs a command of opening the car 1 from the output unit 9 to the drive device, and finishes the control of acquiring the information on the inside of the car 1.

In this embodiment, when next door closing is executed, the processing starts again from the start of the flow of FIG. 4, and the door closing in Step S11 and the acquisition of the information on the car 1 in Step S12 are executed. Thus, the identification module 7*b* repeatedly acquires the identification information each time the car 1 travels. As described above, the identification information on the passengers 6 aboard the car 1 can be acquired and stored in a certain state from the door closing to the door opening including the travel of the car 1.

Figure 5:
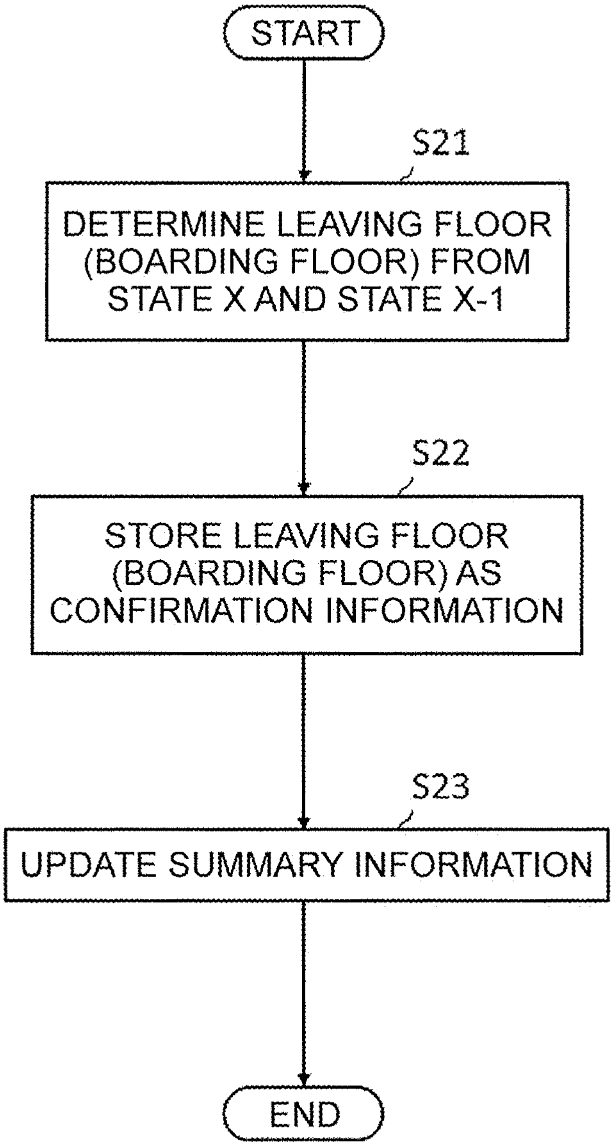
FIG. 5 is a flowchart for illustrating control at the time when confirmation information on the elevator device according to the first embodiment is stored.

With reference to FIG. 5, description is now given of control for the elevator device when confirmation information being information on passengers 6 who leave on each floor 3 is stored in the confirmation information database 11. The confirmation information database 11 is a database in which the determination module 7*c* stores confirmation information each time the state information is added to the state information database 10. In this embodiment, the control of FIG. 5 is executed each time the state information is added to the state information database 10. However, as a matter of course, the control may also be executed, for example, at the end of a day. FIG. 5 is a flowchart for showing control for the elevator device when the confirmation information is stored.

In step S21, the control module 7*a* causes the determination module 7*c* to determine the leaving floor from the state information stored in the state information database 10. The determination module 7*c* obtains a difference in the identification information 10*c* of the state information indicating two states assigned with two consecutive state numbers 10*a* stored in the state information database 10, to thereby determine leaving of one or a plurality of passengers 6. That is, the leaving of the passengers 6 is determined by obtaining a difference in the identification information 10*c* between a state X−1 indicating a first state from the door closing to the door opening including a travel of the car 1 and a state X indicating a second state from the door closing to the door opening including a next travel of the car 1. That is, when the identification information stored in the identification information 10*c* in the first state is not stored in the identification information 10*c* in the second state, passengers 6 having this identification information are determined to have left.

Further, the determination module 7*c* determines, as the leaving floor, the departure floor information 10*b* in the state X indicating the floor 3 from which the car 1 starts the travel in the second state, to thereby determine the floor 3 on which the passengers 6 left.

After that, the processing proceeds to Step S22, and the determination module 7*c* stores the leaving floor, the leaving passengers 6, and the travel direction information 10*d* of the state X−1 indicating the travel direction of the car 1 immediately before the leaving of the passengers 6 in the confirmation information database 11. With reference to FIG. 6, the information stored in the confirmation information database 11 is now described.

The confirmation information database 11 includes a confirmation number 11*a*, leaving floor information 11*b*, passenger information 11*c*, and direction information 11*d*. The confirmation number 11*a* is a serial number. Confirmation information having Y as the confirmation number 11*a* is hereinafter referred to as confirmation Y.

The confirmation number 11*a* corresponds to two consecutive state numbers 10*a* in the state information database 10. In FIG. 6, confirmation 001 of the confirmation information database 11 is information determined by the determination module 7*c* from the state 001 and the state 002 of the state information database 10 of FIG. 3. The leaving floor information 11*b* is information indicating a floor 3 on which the passengers 6 have left, which is determined by the determination module 7*c*. The passenger information 11*c* indicates identification information on the passengers 6 who have left on this floor 3. Moreover, the direction information 11*d* is a travel direction of the car 1 immediately before the stop on the floor 3 indicated by the leaving floor information 11*b*. That is, the direction information 11*d* of the confirmation 001 is the travel direction information 10*d* of the state 001.

The confirmation 001 of FIG. 6 indicates that passengers 6 have not left on the second floor 3*b* being the floor 3 of the departure in the state indicated by the state 002, and the travel direction of the car 1 immediately before the stop on the second floor 3*b* is the upward direction being the travel direction in the state 001. Moreover, confirmation 003 similarly indicates that the passenger B 6*b* having the identification information "B" and the passenger C 6*c* having the identification information "C" have left on the fifth floor 3*e* being the floor 3 of the departure in the state indicated by the state 004, and the travel direction of the car 1 immediately before the stop on the fifth floor 3*b* is the upward direction being the travel direction in the state 003.

In Step S22, the determination module 7*c* creates confirmation information having a number larger by one than the maximum confirmation number 11*a*. After that, the determined leaving floor as the leaving floor information 11*b*, the identification information on the passengers 6 having left as the passenger information 11*c*, and the travel direction information 10*d* of the state X−1 indicating the first state as the direction information 11*d* are stored in confirmation Y being the newly created confirmation information.

After that, the processing proceeds to Step S23, the control module 7*a* refers to the newly added confirmation information in the confirmation information database 11, and updates the summary information database 12. The summary information database 12 is a history of the leaving of the passengers 6.

With reference to FIG. 7, the information stored in the summary information database 12 is now described. The summary information database 12 is a database created for each travel direction of the car 1, and counts the number of times of leaving on each floor 3 for each piece of identification information on the passenger 6. FIG. 7 shows counts of the number of times of leaving during the upward travel of the car 1. There is shown that the number of times of leaving on the fifth floor 3*e* of the passenger A 6*a* having the identification information "A" is 100.

In Step S23, the control module 7*a* refers to the direction information 11*d* of the confirmation information, to thereby determine the summary information database 12 to be updated. When the direction information 11*d* is upward, the summary information database 12 for the upward travel of the car 1 is determined as an update subject. After that, the control module 7*a* refers to the leaving floor information 11*b* and the passenger information 11*c* of the confirmation information, to thereby count up the number of times of leaving for each leaving floor of each of the passengers 6 having left.

Specifically, the control module 7*a* collates, through the two-dimensional face recognition, the passenger information 11*c* with the identification information on the passengers 6 stored in the summary information database 12. When it is determined that a matching passenger 6 is stored as a result of the collation, there is counted up the number of times of leaving which is of the numbers of times of leaving for the respective leaving floors of this passenger 6, and is assigned to the floor 3 indicated by the leaving floor information 11*b* of the confirmation information. Meanwhile, when a matching passenger 6 is not stored, the passenger 6 having the passenger information 11*c* of the confirmation information as the identification information is newly added to the summary information database 12, and the number of times of leaving on the floor 3 indicated by the leaving floor information 11*b* is set to 1.

For example, when the confirmation 003 of FIG. 6 is added to the confirmation information database 11, the summary information database 12 for the upward travel of the car 1 is updated. The leaving floor information 11*b* of the confirmation 003 is the fifth floor 3*e*, and the passenger information 11*c* thereof is "B" and "C," and hence the value indicating the fifth floor 3*e* of each of the passenger B 6*b* having the identification information "B" and the passenger C 6*c* having the identification information "C" in the summary information database 12 is counted up by 1.

As described above, the identification module 7*b* of the elevator device acquires the identification information for each state from the image taken by the imaging device 4*a*. That is, the identification information can be acquired when the car 1 moves from a certain floor 3 to another floor 3 in the state from the door closing to the door opening including the travel without the boarding and the leaving of passengers 6. Moreover, the identification module 7*b* repeatedly acquires the identification information for each state, and hence the determination module 7*c* can determine the leaving floors of the passengers 6 from the change in identification information in the plurality of states and the floors 3 on which the car 1 stops.

According to this embodiment, even when the detection device 4 is not installed on the hall side, it is possible to determine the leaving floors of the passengers 6 through use of the detection device 4 installed in the car 1 and the elevator control device 2. Accordingly, costs for the installation and maintenance are low. Moreover, in such an elevator device that a security camera or the like is already installed in the car 1, it is possible to store the history of the leaving of the passengers 6 by only rewriting software installed in the elevator control device 2 without newly installing a device.

Moreover, a portable information processing device is used in order to store the use history of the elevator device in the related art, and hence users whose use history can be stored are limited to only users carrying the portable information processing devices. However, according to this embodiment, the leaving floors of the elevator users can be stored without requiring the passengers 6 to carry something.

Further, according to this embodiment, the history of the leaving is stored in the summary information database 12 for each piece of acquired identification information. Accordingly, it is not required to set information subject to the storage of the history of the leaving, and hence it is possible to store the histories of the leaving of unspecified passengers 6. For example, when the history is recorded for each identification (ID) of the passenger 6 in the summary information database, it is required to store, in advance, the face information on the passenger 6 corresponding to the ID in the storage unit 16 or the like. Accordingly, the history of a passenger 6 for which the setting has not been made in advance is not stored. When the history is stored for each piece of identification information as in this embodiment, the operation of storing the face information on the passenger 6 corresponding to the ID is not required. Accordingly, also in a facility used by unspecified passengers 6 such as a department store, when the same passenger 6 uses the elevator device for a plurality of times, the history is stored for each piece of face information being the identification information on this passenger 6. Thus, the history is created while the passenger 6 is saved from trouble of setting the own face information.

Figure 8:
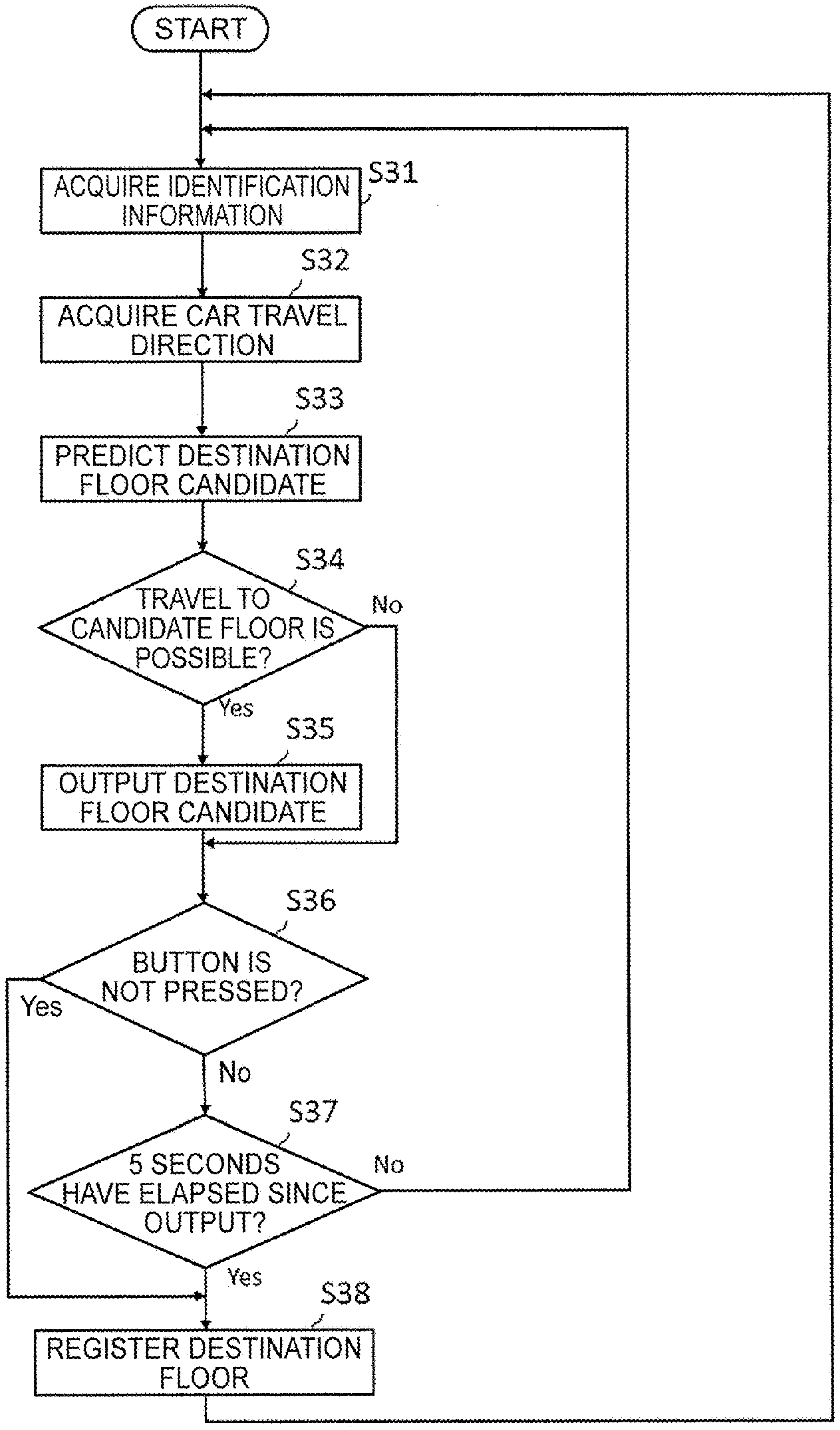
FIG. 8 is a flowchart for illustrating control at the time when a destination floor candidate of the elevator device according to the first embodiment is predicted.

With reference to FIG. 8, description is now given of control for the elevator device when a destination floor candidate is predicted. FIG. 8 is a flowchart for illustrating the control for the elevator device when the destination floor candidate is predicted.

In Step S31, the control module 7*a* causes the identification module 7*b* to acquire the identification information. The identification module 7*b* acquires the image from the imaging device 4*a* through the input unit 8 as in Step S14 of FIG. 6, and extracts, as the identification information, the face information on each passenger 6 from the acquired image. After that, the face information is added to the temporary storage destination as in Step S16, and the processing proceeds to Step S32. In Step S32, the control module 7*a* acquires a next travel direction of the car 1, and the processing proceeds to Step S33.

In Step S33, the control module 7*a* causes the prediction module 7*d* to predict a candidate of a destination floor in accordance with the history of the numbers of times of leaving stored in the summary information database 12. The prediction module 7*d* accesses the storage unit 16, refers to the summary information database 12 corresponding to the travel direction of the car 1 acquired by the control module 7*a* in Step S32, and specifies a floor 3 on which passengers 6 each having the identification information corresponding to the identification information acquired by the identification module 7*b* in Step S31 have left for the largest number of times. After that, the prediction module 7*d* predicts the specified floor 3 as a candidate floor 13 of the destination floor of this passenger 6. Each of rectangles of FIG. 7 indicates the floor 3 on which passengers 6 have left for the largest number of times, and is thus a candidate floor 13 being the candidate of the destination floor predicted by the prediction module 7*d* in this embodiment.

After that, in Step S34, the control module 7*a* acquires the current floor 3, and determines whether or not the candidate floor 13 predicted in Step S33 exists in the travel direction of the car 1 acquired in Step S32 from the current floor 3. When the candidate floor 13 is a floor 3 to which the car 1 can travel, the processing proceeds to Step S35. When the candidate floor 13 is a floor 3 to which the car 1 cannot travel, the processing proceeds to Step S36.

For example, it is assumed that the current floor 3 is the second floor 3*b*, and the passenger A 6*a* who presses a button for the travel direction of the upward direction to call the car 1 of the elevator device 1 in a hall gets aboard. From FIG. 7, the candidate floor 13 of the passenger A 6*a* is the fifth floor 3*f*. The fifth floor 3*f* exists in the upward direction with respect to the second floor 3*b* being the boarding floor, and hence the control module 7*a* executes the processing in Step S35.

Figure 9:
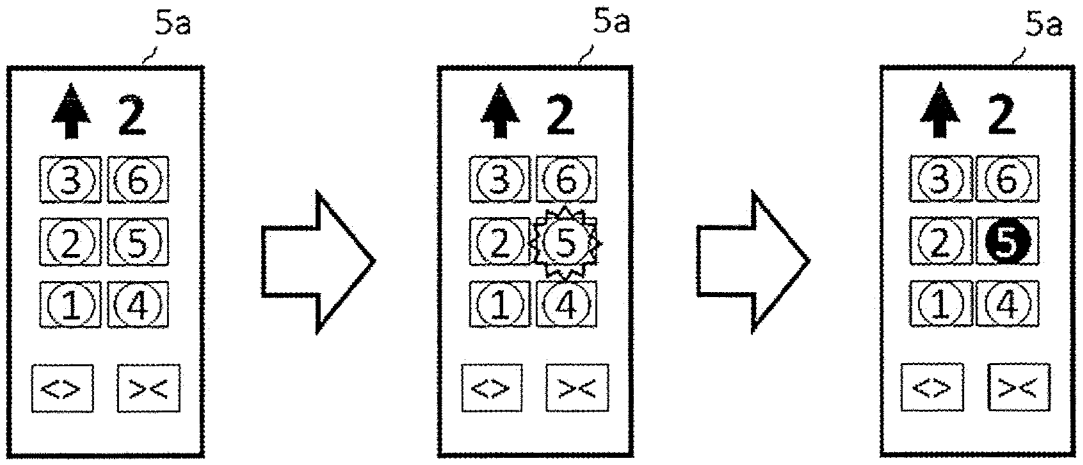
FIG. 9 is a view for illustrating a button-type destination navigation device at the time when one passenger is aboard in the first embodiment.

In Step S35, the control module 7*a* outputs a command for displaying the candidate floor 13 to the button-type destination navigation device 5*a* being the display device 5 through the output unit 9. A display example of the button-type destination navigation device 5*a* at the time when the candidate floor 13 is output is illustrated in FIG. 9. In a left view of FIG. 9, there is illustrated a display example of the button-type destination navigation device 5*a* at the time when a candidate floor 13 is not displayed. In a center view of FIG. 9, there is illustrated a display example at the time when the fifth floor 3*e* is predicted as the candidate floor 13. The center view of FIG. 9 indicates that a button corresponding to the floor 3 being the candidate floor 13 is blinking.

Moreover, in Step S35, the control module 7*a* starts a timer referred to in Step S37 described later simultaneously with the output of the candidate floor 13. This timer is started for each floor 3 being the candidate to be output.

After that, in Step S36, the control module 7*a* checks, through the input unit 8, whether or not a button for a destination floor is pressed. That is, when a signal representing that a button for a destination floor is pressed is not output from the button-type destination navigation device 5*a* to the input unit 8, the processing proceeds to Step S37. When the signal is output, the processing proceeds to Step S38. In Step S37, the control module 7*a* determines whether or not a certain period, for example, five seconds or longer have elapsed since the start of the timer. When the elapsed period is five seconds or longer, the control module 7*a* executes processing in Step S38. When the elapsed period is shorter than five seconds, the control module 7*a* again executes the processing starting from Step S31.

In Step S38, the control module 7*a* registers, as the destination floor, the candidate floor 13 output in Step S35 or a floor 3 assigned to the button determined to be pressed in Step S36. A display example of the button-type destination navigation device 5*a* at the time when the destination floor is registered is illustrated in a right view of FIG. 9. The right view of FIG. 9 indicates that the button corresponding to the destination floor has changed from the blinking state to a lighting state.

Figure 10:
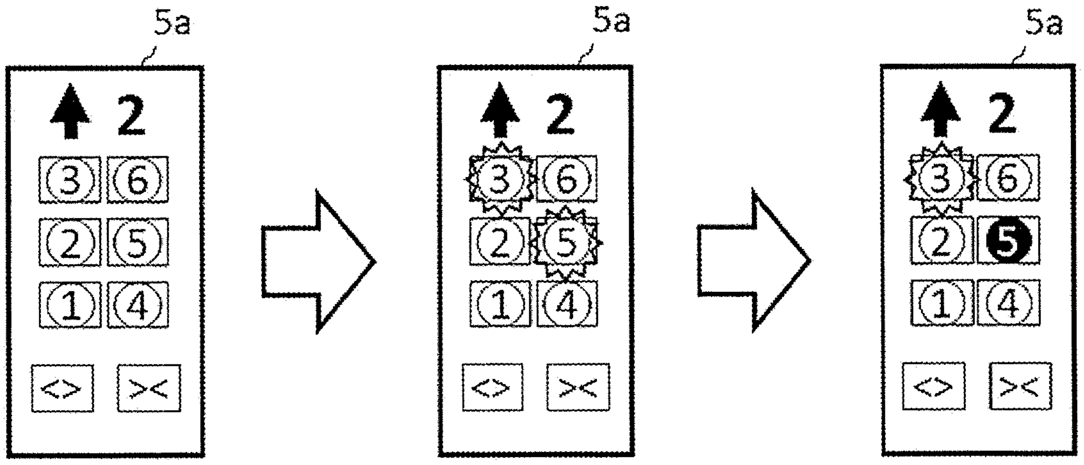
FIG. 10 is a view for illustrating the button-type destination navigation device at the time when a plurality of passengers are aboard in the first embodiment.

On this button-type destination navigation device 5*a*, when a plurality of candidate floors 13 are predicted, the plurality of candidate floors 13 are displayed. FIG. 10 is a view for illustrating the button-type destination navigation device 5*a* at the time when a plurality of candidate floors 13 are predicted. In a center view of FIG. 10, there is illustrated a display example of the button-type destination navigation device 5*a* when the third floor 3*c* is predicted as a candidate floor for a certain passenger 6, and the fifth floor 3*e* is predicted as a candidate floor for another passenger 6. In this diagram, buttons indicating the third floor 3*c* and the fifth floor 3*e* are blinking. In a right view of FIG. 10, there is illustrated a display example of the button-type destination navigation device 5*a* at the time when the button indicating the fifth floor 3*e* is pressed as input by the passenger 6 as the destination floor. The button indicating the fifth floor 3*e*, and is pressed by the passenger 6 has changed from the blinking state to the lighting state. The button for the third floor 3*c* which has not been pressed continues blinking.

As described above, the user of the elevator device is saved from trouble of registering the candidate floor 13 in advance by the user himself or herself, and the candidate floor 13 is set through the prediction. Moreover, according to this embodiment, even when a plurality of passengers 6 are aboard the elevator device, the candidate floors 13 can be predicted for all of the passengers 6.

Further, according to this embodiment, the destination floor can be registered while saving trouble of pressing the button for the destination floor when the elevator is used. According to this embodiment, for a passenger 6 who has not pressed the button for the destination floor, a leaving floor is stored through the leaving determination using the camera, thereby creating the history of the leaving used for the prediction of the candidate floor 13. Accordingly, this elevator device can more accurately determine the destination floor of the passenger 6.

Second Embodiment

A second embodiment is an elevator device which uses the method as in the first embodiment to determine a boarding floor, and stores the boarding floor in combination with the leaving floor information 11*b*. Description is now mainly given of a different point from the first embodiment. In FIG. 11, the same reference symbols as those of FIG. 6 denote an equivalent or corresponding part. First, with reference to FIG. 2, a configuration in this embodiment is described.

The determination module 7*c* includes a software module configured to determine a leaving floor and a boarding floor of each passenger 6 from a change in the identification information 10*c* between two successive states and the departure floor information 10*b* stored in the state information database 10 shown in FIG. 3.

With reference to FIG. 5, an operation in this embodiment is now described. In Step S21 in the first embodiment, a leaving floor is determined from two consecutive states in the state information database 10. In this embodiment, the determination module 7*c* additionally determines a boarding floor.

Specifically, when identification information not stored in the identification information 10*c* of the state X−1 indicating the first state is stored in the identification information 10*c* of the state X indicating the second state, it is determined that a passenger 6 having this identification information boards the car 1. Moreover, the determination module 7*c* determines, as a boarding floor, the departure floor information 10*b* of the state X−1 indicating the floor 3 on which the car 1 starts the travel in the first state.

After that, in Step S22, the determination module 7*c* stores the determined boarding floor and the identification information on boarding passengers 6 in the temporary storage destination of the storage unit 16. In this state, when the determination module 7*c* determines that passengers 6 having left exist as described in the first embodiment, the determination module 7*c* collates the identification information on the passengers 6 having left with the identification information on the passengers 6 stored in the temporary storage destination through the two-dimensional face recognition. The determination module 7*c* stores, as boarding/leaving information 11*e*, boarding floors of matching passengers 6 and the identification information on these passengers 6 in the confirmation information database 19 of FIG. 11.

In the first embodiment, the confirmation information database 11 stores the passenger information 11*c* and the direction information 11*d* together with the leaving floor information 11*b*. In this embodiment, as shown in FIG. 11, the confirmation database 19 stores, together with the leaving floor information 11*b*, the boarding/leaving information 11*e* indicating a boarding floor 3 of each of the passengers having left on the floor 3 indicated by the leaving floor information 11*b*. The confirmation 003 of FIG. 11 indicates that, on the fifth floor 3*e*, the passenger B 6*b* having the identification information "B" and having boarded on the second floor 3*b* and the passenger C 6*c* having the identification information "C" and having boarded on the third floor 3*c* have left.

After that, in Step S23, the control module 7*a* refers to the newly added confirmation information in the confirmation information database 19, and updates the summary information database 12. In this embodiment, the control module 7*a* refers to the boarding/leaving information 11*e* on the passenger 6, to thereby determine the summary information database 12 to be updated based on the boarding floor.

In the first embodiment, the summary information database 12 of FIG. 7 summarizes the leaving floors of the passengers 6 for each travel direction of the car 1. However, in this embodiment, the summary information database 12 summarizes the leaving floors of the passengers 6 for each boarding floor of the passengers 6.

As described above, the boarding floor can be determined through use of the same method and device as those in the first embodiment. Moreover, the destination floor can more accurately be predicted by storing the boarding floors together with the leaving floors, and selecting and referring to the summary information database 12 corresponding to the boarding floor of a passenger 6 being a subject to the prediction for the destination floor in Step S33 of FIG. 8.

Third Embodiment

A third embodiment acquires easily acquired information such as a color of clothes of a passenger 6, to thereby enable the determination of a leaving floor even when the identification information such as the face information for easily identifying the passenger 6 cannot be acquired in the period from the door closing to the door opening including the travel of the car 1. For example, when the face information is used as the identification information, in some cases, the face information is not acquired due to, for example, the face of a passenger 6 directing toward a direction opposite to the installation location of the camera. In this embodiment, even when the face information cannot be acquired, a passenger 6 is identified by acquiring other image information capable of specifying the passenger 6 in the car 1, thereby being capable of determining a leaving floor of this passenger 6. Description is now mainly given of a different point from the first embodiment.

Figure 12:
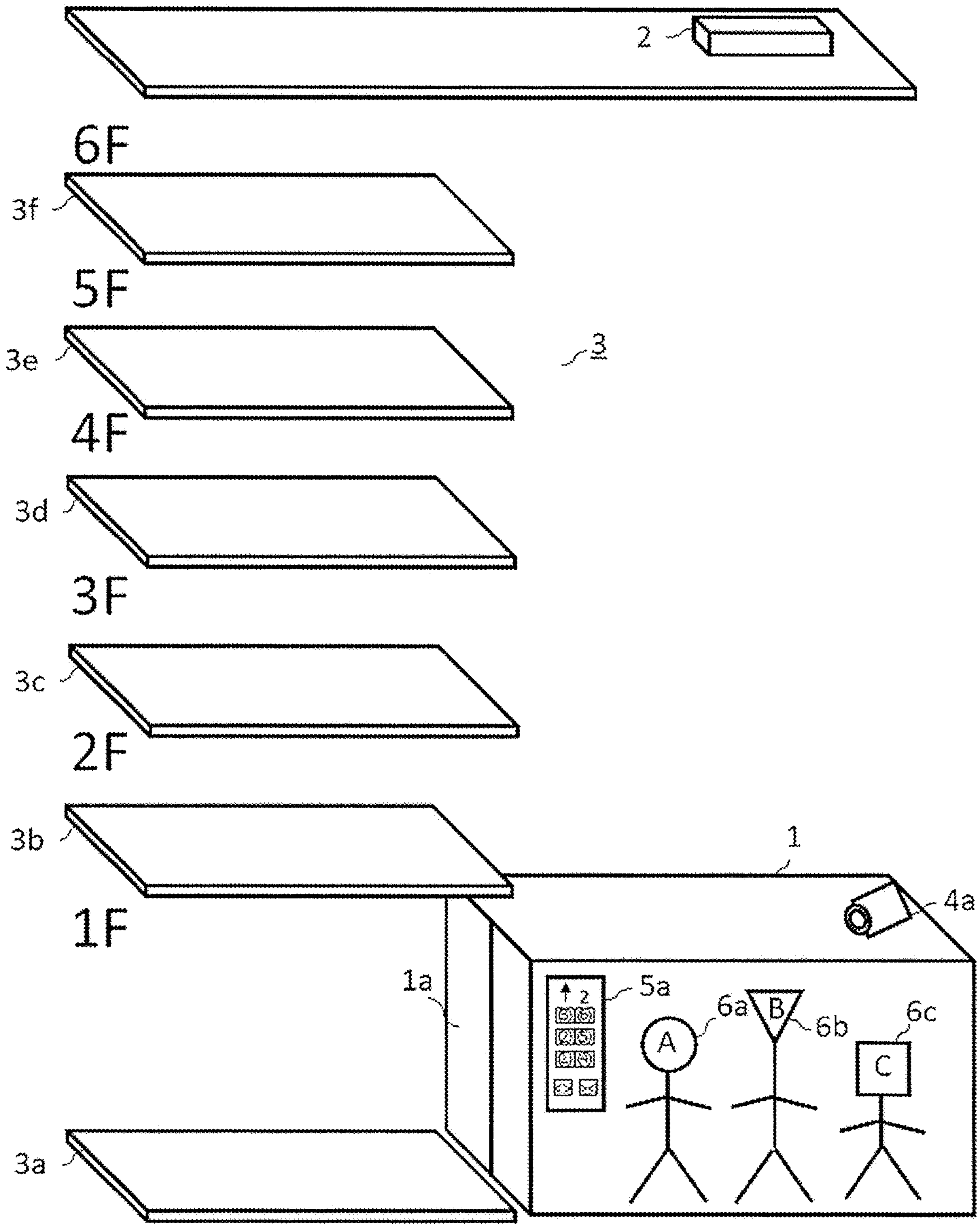
FIG. 12 is a diagram for illustrating the elevator device according to a third embodiment of this disclosure.

First, with reference to FIG. 12, description is given of a configuration of the entire elevator device according to this embodiment. In FIG. 12, the same reference symbols as those of FIG. 1 denote an equivalent or corresponding part. The elevator device of FIG. 12 is different from the entire elevator device of FIG. 1 according to the first embodiment, and the imaging device 4*a* is installed at an upper potion on an opposed side as viewed from the door 1*a* side toward the inside of the car 1 so that the imaging device 4*a* can take an image of the door 1*a* side.

With reference to FIG. 2 and FIG. 13, details of a configuration of this embodiment are now described. The identification module 7*b* in the first embodiment acquires the face information on the passenger 6 being the feature information from the image information taken by the imaging device 4*a*. The identification module 7*b* in this embodiment includes a software module configured to specify, when the face information being the feature information on a passenger 6 extracted in the first embodiment is extracted, other feature information on this passenger 6 as additional feature information, and to store the face information 14*b* and additional feature information 14*c* in a correspondence table 14. Moreover, the identification module 7*b* includes a software module configured to acquire, when one of the face information 14*b* or the additional feature information 14*c* is extracted, the identification information.

In the storage unit 16, the correspondence table 14 described later is stored. With reference to FIG. 13, the information stored in the correspondence table 14 is described. The correspondence table 14 is a database for storing the face information 14*b* and the additional feature information 14*c* held by the same passenger 6. The correspondence table 14 is formed of a correspondence number 14*a*, the face information 14*b*, and the additional feature information 14*c*. The correspondence number 14*a* is a serial number. The face information 14*b* is extracted by the identification module 7*b*. The additional information 14*c* is specified by the identification module 7*b*. This additional feature information 14*c* is a color of clothes in this embodiment, and includes information on a rear view of a passenger 6.

Figure 14:
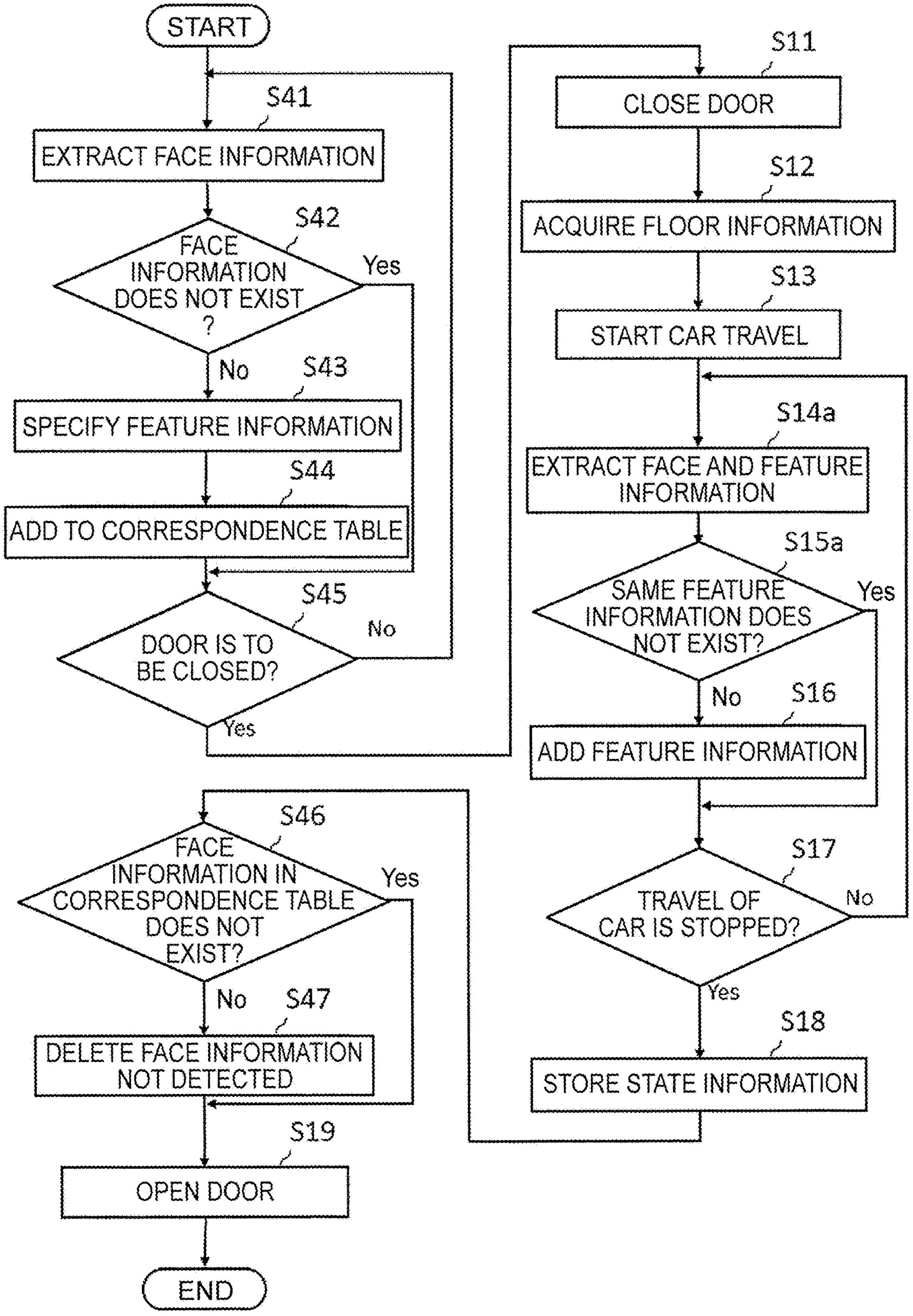
FIG. 14 is a flowchart for illustrating the control at the time when the state information on the elevator device according to the third embodiment is stored.

With reference to FIG. 14, an operation of this embodiment is now described. In FIG. 14, the same reference symbols as those of FIG. 4 denote an equivalent or corresponding part. FIG. 14 is a flowchart for illustrating control for the elevator device when the information is acquired in this embodiment.

First, the car 1 stops on one of the floors 3, and the processor 7 starts this control in the state in which the door 1*a* is open. First, in Step S41, the identification module 7*b*, as in Step S14 in the first embodiment, extracts the face information 14*b*, and the processing proceeds to Step S42. The extracted face information 14*b* in this state is, for example, the face information 14*b* on the passengers 6 boarding the car 1. As illustrated in FIG. 12, the imaging device 4*a* is provided at the location capable of taking images of the faces of the passengers 6 when the passengers 6 are boarding the car 1. Meanwhile, the face information 14*b* on passengers 6 who are already aboard the car 1 can also be acquired, but when the faces are not directed toward the imaging device 4*a*, in some cases, the face information is not acquired.

After that, in Step S42, the identification module 7*b* collates, through the two-dimensional face recognition, to determine whether or not the face information extracted in Step S41 is stored in the correspondence table 14. When the face information is not stored in the correspondence table 14, the processing proceeds to Step S43. When the face information is already stored in the correspondence table 14, the processing proceeds to Step S45.

In Step S43, the identification module 7*b* specifies the additional feature information on the passengers 6 having the face information extracted in Step S41, and the processing proceeds to Step S44. Specifically, the identification module 7*b* detects, through the same processing as that for detecting the partial image indicating the face of a person in Step S14, a partial image indicating the clothes from an image of a portion (for example, in terms of the actual distance, a region from 10 cm to 60 cm below the bottom of the face and 50 cm in width) having a certain positional relationship with the partial image indicating the face of the person detected in Step S14. After that, color information being an average of hue values in this partial image is considered as the color of the clothes, to thereby specify the additional feature information on the passenger 6. It is often the case that a color of the clothes in a front view including the face of the passenger 6 and a color of the clothes in a rear view of the passenger 6 are the same, and hence the color of the clothes includes information on the rear view of the passenger 6.

In Step S44, the identification module 7*b* adds the correspondence between the face information 14*b* and the additional feature information 14*c* to the correspondence table 14. After that, in Step S45, the control module 7*a* determines whether or not to close the car 1. This determination is made based on, for example, a period which has elapsed since the door 1*a* opened, a human sensor installed on the door 1*a*, presence or absence of pressing of a door closing button provided to the button-type destination navigation device 5*a*, or the like. When the door 1*a* is to be closed, the control module 7*a* executes the processing in Step S11. When the door 1*a* is still not to be closed, the processing returns to Step S41, and the same processing is repeated in order to, for example, detect feature information on another passenger 6.

From Step S11 to Step S13, the control module 7*a* controls the car 1 and the like in the same process as that in the first embodiment. In Step S14*a*, the identification module 7*b* extracts the face information 14*b* as in Step S14 in the first embodiment, and extracts the additional feature information 14*c* as in Step S43.

In Step S15*a*, the identification module 7*b* determines whether or not the face information 14*b* extracted in Step S14*a* is already stored in the temporary storage destination as in Step S15 in the first embodiment. In addition to this determination, the identification module 7*b* refers to the correspondence table 14, to thereby determine whether or not face information 14*b* corresponding to the additional feature information extracted in Step S14*a* is already stored in the temporary storage destination. That is, the identification module 7*b* determines whether or not there exist one or a plurality of pieces of feature information 14*c* stored in the correspondence table 14 matching or similar to the additional feature information extracted in Step S14*a*. After that, the identification module 7*b* determines whether or not face information 14*b* stored in association with the feature information 14*c* matching or similar to the extracted additional feature information is stored in the temporary storage destination as in Step S15 in the first embodiment. The determination of the similarity of the additional feature information is made based on whether or not a difference in color information is within a threshold value or smaller than a threshold value. In this case, the threshold value is, for example, an angle of a hue circle, and the additional feature information having a difference of 30 degrees or less in hue is determined to be within the threshold value, and thus to be similar.

When face information 14*b* matching the extracted face information or face information 14*b* corresponding to the extracted additional feature information is not stored in the temporary storage destination yet, that is, the determination in Step S15*a* is "No," the identification module 7*b* executes processing in Step S16. In other words, when the face information 14*b* or the additional feature information 14*c* extracted in Step S14*a* is face information 14*b* or additional feature information 14*c* extracted for the first time for the same passenger 6 after the door closing in Step S11, the identification module 7*b* executes the processing in Step S16. When the determination in Step S15*a* is "Yes," the identification module 7*b* skips the processing in Step S16, and executes processing of Step S17.

In Step S16, when the face information is extracted in Step S14*a*, the identification module 7*b* stores this face information in the temporary storage destination as in the first embodiment. Moreover, when the feature information 14*c* is extracted in Step S14*a*, the identification module 7*b* refers to the correspondence table 14, to thereby store the face information 14*b* corresponding to the extracted feature information 14*c* in the temporary storage destination. As described above, when there exists even one type of information, among the plurality of types of identification information, which can specify a passenger 6, the identification module 7*b* in this embodiment specifies this passenger 6 as a passenger 6 aboard the car 1. Thus, for example, even in a case in which an image of the face cannot be taken by the imaging device 4*a*, when the color information such as clothes is acquired, a passenger 6 aboard the car 1 can be identified.

After that, the processing proceeds to Step S17, the processing from Step S14 to Step S17 is repeated until the car 1 stops as in the first embodiment, and the processing proceeds to Step S18. In Step S18, the identification module 7*b* stores, as the identification information 10*c*, the face information stored in the temporary storage destination in the state information database 10 as shown in FIG. 3, and deletes the information in the temporary storage destination.

In Step S46, the identification module 7*b* collates the identification information 10*c* of the state information newly stored in Step S18 and the face information 14*b* stored in the correspondence table 14 with each other through the two-dimensional face recognition. When there exists the face information 14*b* which is stored in the correspondence table 14, and does not exist in the identification information 10*c*, the processing proceeds to Step S47. When all pieces of face information 14*b* are stored in the identification information 10*c*, the processing proceeds to Step S19.

In Step S47, the control module 7*a* deletes correspondence information corresponding to the face information 14*b* which is not stored in the state information database 10 in Step S18. That is, a passenger 6 for whom none of the face information 14*b* and the additional feature information 14*c* of which are acquired after Step S11 is deleted from the correspondence table 14. In Step S19, the control module 7*a* opens the car 1, and finishes the control of acquiring the information on the inside of the car 1 as in the first embodiment.

In the first embodiment, when the door is closed for the next time, the operation of acquiring the information on the car 1 is started again. However, in this embodiment, the next operation of acquiring the information is started immediately. In this case, the information in the correspondence table 14 is taken over to the next operation for the information acquisition.

As described above, not only the face information 14*b* acquired when the passengers 6 get aboard the car 1, but also the additional feature information 14*c* acquired in the state from the door closing to the door opening without the boarding and the leaving of the passengers 6 can be used as the feature information for specifying the identification information 10*c*. That is, even when the face information 14*b* such as the face information for easily identifying the passenger 6 cannot be acquired in the period from the door closing to the door opening including the travel of the car 1, the leaving floor can be determined through the same method as that in the first embodiment by acquiring the feature information 14*c* being the identification information such as the color of the clothes which can easily be acquired independently of the direction of a passenger 6 and the like.

In particular, by acquiring the information on the rear view of a passenger 6 such as the color of the clothes as the additional feature information 14*c*, even when the imaging device 4*a* is installed so that the imaging device 4*a* can take an image of the door 1*a* side of the car 1, the leaving floor can be determined.

Moreover, the passengers 6 can accurately be identified through the additional feature information 14*c* by updating the correspondence table 14 in each period from the door closing to the door opening including the travel of the car 1 through the processing in Step S46 and Step S47 as long as the number of passengers 6 substantially equal to a capacity of the elevator device can be identified. Thus, the history of the leaving can more accurately be acquired through use of the information such as the color of the clothes, which is easily acquired independently of a posture and a direction of a person.

Fourth Embodiment

A fourth embodiment tracks, through image recognition processing, a passenger 6 whose identification information has once been acquired, thereby being capable of determining a leaving floor even when the identification information cannot be acquired each time in the period from the door closing to the door opening including the travel of the car 1. In the third embodiment described above, the case in which the face information cannot be acquired is compensated through use of the feature information such as the color while coordinate information on a passenger 6 in a plurality of images is used as the additional feature information to track the coordinate of the passenger 6, to thereby determine a leaving floor of this passenger 6 in this embodiment. Description is now mainly given of a different point from the first embodiment.

First, with reference to FIG. 2 and FIG. 15, a configuration in this embodiment is described. The identification module 7*b* in the first embodiment acquires the face information on the passenger 6 being the identification information from the image information taken by the imaging device 4*a*. The identification module 7*b* in this embodiment includes, in addition to the software module in the first embodiment, a software module which tracks a passenger 6 through the image recognition processing, a software module which stores, in a correspondence table 20, the face information being the feature information on the passenger 6 and the coordinate information on the passenger 6 being tracked, and a software module which acquires the identification information when the passenger 6 can be tracked.

Moreover, the correspondence table 20 is stored in the temporary storage destination of the storage unit 16. With reference to FIG. 15, the table 20 used to track the passengers 6 is described. The correspondence table 14 described in the third embodiment stores the face information 14*b* and the additional feature information 14*c* associated with each other. The correspondence table 20 in this embodiment stores coordinate information 14*d* on the passengers 6 associated with the face information 14*b* being the feature information, and is formed of the correspondence number 14*a*, the face information 14*b*, and the coordinate information 14*d*.

Figure 16:
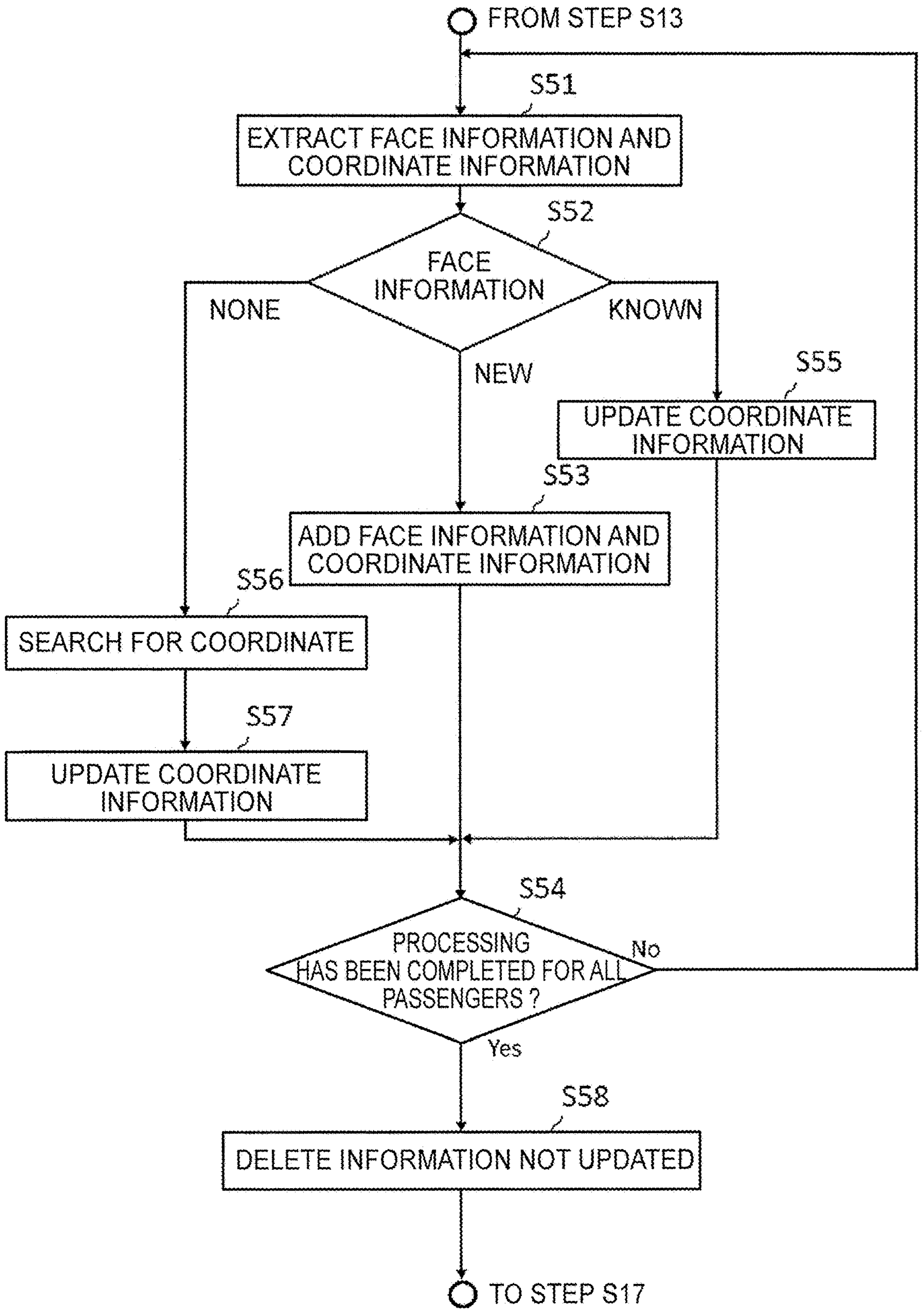
FIG. 16 is a flowchart for illustrating control at the time when the correspondence table of the elevator device according to a fourth embodiment of this disclosure is updated.

With reference to FIG. 4 and FIG. 16, an operation in this embodiment is now described. FIG. 16 is a flowchart for illustrating a modification example of processing of a portion of broken lines of FIG. 4, and illustrating control of updating the identification information through use of the coordinate information.

In this embodiment, the identification module 7*b* of the elevator device recognizes a passenger 6 from the image taken by the imaging device 4*a* through the image recognition processing, and constantly updates a current coordinate being current position information on the recognized passenger 6, to thereby execute the tracking. That is, the identification module 7*b* repeatedly acquires the coordinate information to identify the same passenger 6 as a specific passenger 6 having the coordinate information acquired in previous or earlier coordinate acquisition.

After the processor 7 executes processing of Step S11 to Step S13 of FIG. 4, the processor 7 executes processing of FIG. 16 in place of the processing of from Step S14 to Step S16 indicated by the broken lines of FIG. 4.

In Step S51, the control module 7*a* causes the identification module 7*b* to extract the face information and the coordinate information. Specifically, the identification module 7*b* reads the image information taken by the imaging device 4*a* from the storage unit 16, and applies pattern matching to the image information. For example, the identification module 7*b* applies contour line extraction processing to the image information, and collates data on a contour line and data on a contour line indicating a shape of a head of a human with each other. The data on the contour line used for the collation is, for example, data which uses an average outline shape of the head of the human, indicates, for example, an ellipsoidal shape, and enables detection of an image thereof even when the head is directed forward, sideward, or rearward. With this processing, the identification module 7*b* acquires data on contour lines of one or a plurality of heads and coordinate information thereon. When the processing is applied to the image information corresponding to one screen for the first time, it is required to execute the above-mentioned pattern matching processing. However, when the processing is applied to the same image information for the second or later time, this processing for the contour line may be omitted.

After that, in Step S52, the identification module 7*b* applies process equivalent to that in Step S14 of FIG. 4 to one of a plurality of pieces of data on the acquired contour lines, to thereby extract the face information. When the passenger 6 does not face the installation direction of the imaging device 4*a*, in some cases, the face information is not extracted. In such a case, the identification module 7*b* holds, as the face information, the fact that the face information cannot be extracted. For example, when data matching a shape of the eye is not included in the data on the contour, the identification module 7*b* determines that the face information could not be extracted.

After that, the identification module 7*b* determines whether extracted face information could not be extracted, the extracted face information is new information, or the extracted face information is known information. Whether the extracted face information is new information or leaving information is determined by the identification module 7*b* referring to the correspondence table 20 of FIG. 15, and is determined through the same algorithm as that in Step S15 of FIG. 4. When the face information is new information, the identification module 7*b* accesses the storage unit 16 in Step S53, and adds this face information and the coordinate information to the correspondence table 20 of FIG. 15 together with the correspondence number.

After that, the identification module 7*b* determines whether or not the processing has been applied to all pieces of data on the extracted contour lines of the heads, that is, all of the passengers 6 included in the image information. When the determination is "No," the processing returns to Step S51, and the identification device 7*b* executes the processing in order to execute the identification processing for a next passenger 6.

When it is determined that the face information is known in Step S52, the processing proceeds to Step S55, the identification module 7*b* accesses the storage unit 16, and rewrites, based on this face information, the coordinate information 14*d* corresponding to this face information with the coordinate information extracted in Step S51.

When it is determined that face information does not exist, that is, the face information cannot be extracted in Step S52, the identification module 7*b* accesses the storage unit 16 in Step S56, and collates the coordinate information 14*d* of the correspondence table 20 and the acquired coordinate information with each other, to thereby search for and specify coordinate information 14*d* satisfying such a condition that a distance between the coordinate information 14*d* and the acquired coordinate information is shortest within a certain threshold value. In this case, "the coordinate information 14*d* of the correspondence table 20" is the coordinate information acquired for a previous or earlier time, and "the acquired coordinate information" is the coordinate information acquired for the current time. Through this processing, the motion of each passenger 6 can be tracked, and even when the face information cannot be temporarily acquired, the identification module 7*b* can identify the passenger 6 appearing in the image information, and can determine that the feature information extracted from the image information is the information indicating the specific passenger 6.

The threshold value can be held as a value determined in advance, for example, a typical width of a head of a human or a value corresponding to a frame rate of a movie, for example, a distance converted from an actual distance of 10 cm or shorter between the centers to a distance in the image information. It is not required that the threshold value be a value determined in advance, and may be specified through, for example, the processor 7 calculating this distance.

After that, in Step S57, the identification module 7*b* rewrites the specified coordinate information 14*d* of the correspondence table 20 with the acquired coordinate information.

In Step S54, when the identification module 7*b* determines that the processing is finished for all of the passengers included in the image information, the identification module 7*b* executes processing in Step S58. The identification module 7*b* specifies information which is of the information described in the correspondence table 20, and none of the face information 14*b* and the coordinate information 14*d* of which are updated from Step S52 to Step S57, and deletes the specified information as information on a passenger 6 the tracking for which is disrupted, that is, who has likely left the car 1. As a result of this processing, only information on the passengers 6 aboard the car 1 remains in the correspondence table 20. In Step S54, when the identification module 7*b* determines that the processing has not been finished for all of the passengers, the processing returns to Step S51, and the identification module 7*b* repeats the same processing for recognizing a next passenger.

When the processing in Step S58 is finished, the processor 7 executes the processing in Step S17 of FIG. 4. That is, until the car 1 stops, the processor 7 executes the above-mentioned tracking processing. After that, in Step S18, the identification module 7*b* of the processor 7 uses the face information 14*b* of the correspondence table 20 of FIG. 15 to store the state information in the state information database 10 of FIG. 3. Specifically, the identification module 7*b* accesses the storage unit 16, reads all pieces of face information 14*b* stored in the correspondence table 20, and stores, as the identification information 10*c* of the state information database 10, the face information 14*b* in the storage unit 16. In this case, the identification module 7*b* adds a row to the table of FIG. 3, and creates state information having a number larger by one than the largest state number 10*a*. After that, the identification module 7*b* adds the acquired face information to the identification information 10*c* of this state information.

As a result, for a passenger 6 whose face information has been extracted even once, the correspondence between the face information 14*b* and the current coordinate information 14*d* is stored in the correspondence table 14 until the tracking is disrupted. Thus, the current coordinate of the passenger 6 can be used as the identification information, thereby being capable of identifying the passenger 6.

Moreover, even when information such as the face information for easily identifying the passenger 6 cannot be acquired each time in the period from the door closing to the door opening of the car 1, a leaving floor can be determined. For example, even when the face information 14*b* on the passenger A 6*a* cannot be acquired in the state 004 of FIG. 3, when the face information is acquired in the state 002 or the state 003, it is possible to determine the leaving of the passenger A 6*a* on the third floor 3*f* through the disruption of the tracking of the passenger 6 associated with the face information "A" on the passenger A 6*a* in a state 005.

For the collation of the coordinate information 14*d* in Step S56, all of the pieces of coordinate information 14*d* and the acquired coordinate are not collated with each other, and the coordinate information 14*d* corresponding to face information specified in the same image may be excluded from the collation subjects. With this configuration, the identification accuracy for the passenger 6 can be increased. Moreover, in the description given above, the coordinate information 14*d* closest in distance to the acquired coordinate is associated to track a passenger 6, but the method for the tracking is not limited to this example. For example, for all patterns of combination between coordinates in contour line data on a plurality of heads extracted from the image information and the coordinates of the plurality of pieces of coordinate information 14*d* in the correspondence table 20, distances between the coordinates and a sum thereof are calculated, and a combination pattern which gives the smallest sum may be used to track passengers 6.

Fifth Embodiment

A fifth embodiment uses, as the additional feature information, information acquired by a reception device 4*b* and a transmission device 4*c* for wireless communication supplementarily together with the image information acquired by the imaging device 4*a*, thereby being capable of more accurately determining a leaving floor. Description is now mainly given of a different point from the first embodiment.

Figure 17:
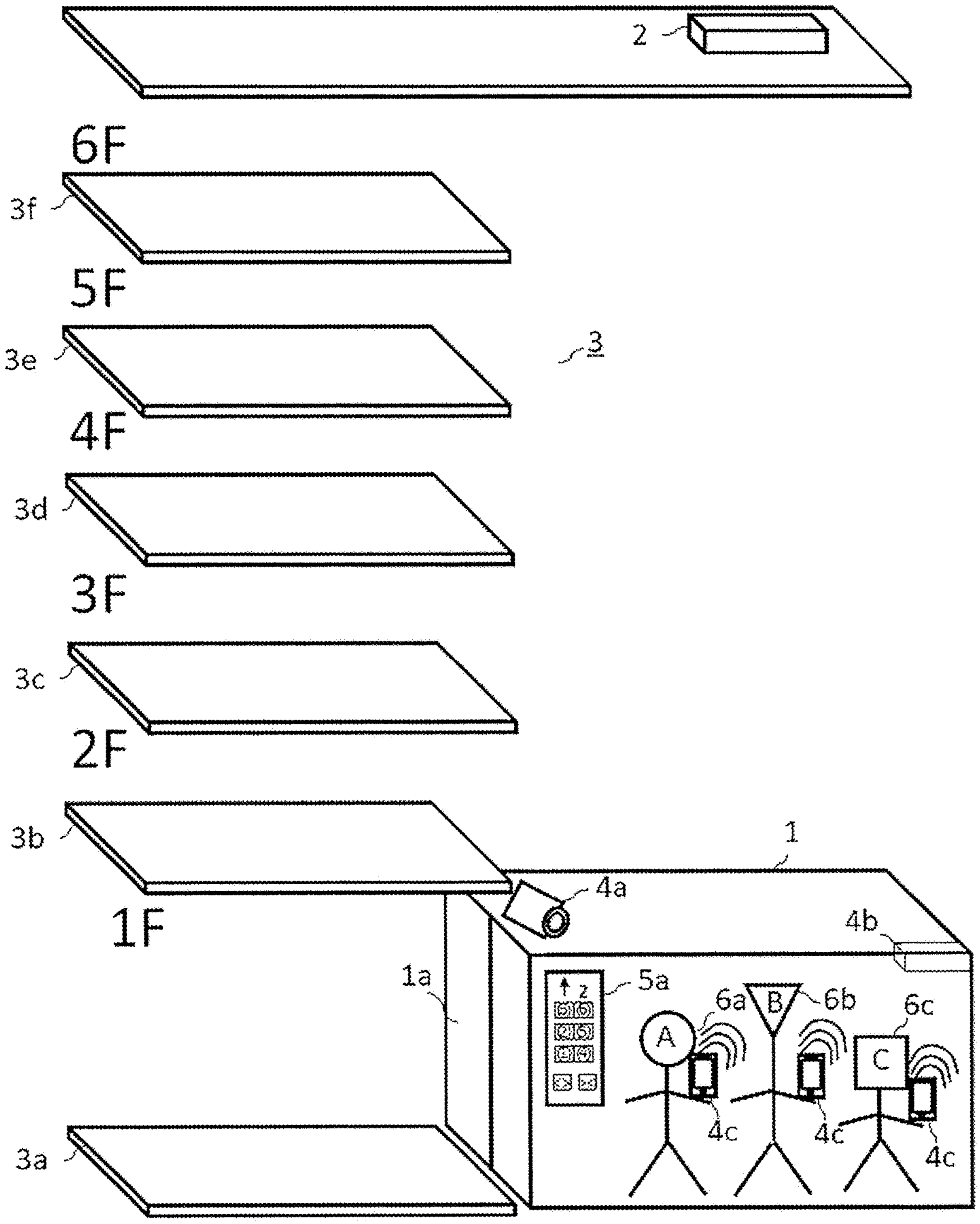
FIG. 17 is a diagram for illustrating the elevator device according to a fifth embodiment of this disclosure.

First, with reference to FIG. 17, description is given of a configuration of the elevator device according to this embodiment. In FIG. 17, the same reference symbols as those of FIG. 1 denote an equivalent or corresponding part. The car 1 of the elevator device according to this embodiment includes a reception device 4*b* in addition to the imaging device 4*a* installed in the elevator device according to the first embodiment. The reception device 4*b* is an example of the detection device 4, and receives the feature information transmitted from the transmission device 4*c* held by a passenger 6.

The reception device 4*b* detects and receives a management packet being the detection information transmitted from the transmission device 4*c* through a wireless local area network (LAN). This management packet includes a media access control (MAC) address being the additional feature information. The reception device 4*b* is connected to the input unit 8 of the elevator control device 2 in a wired form. The reception device 4*b* transmits the received management packet to the input unit 8.

The transmission device 4*c* is a portable information terminal (for example, smartphone) held by the passenger 6. The transmission device 4*c* continues to periodically transmit the management packet including an own MAC address.

Figure 18:
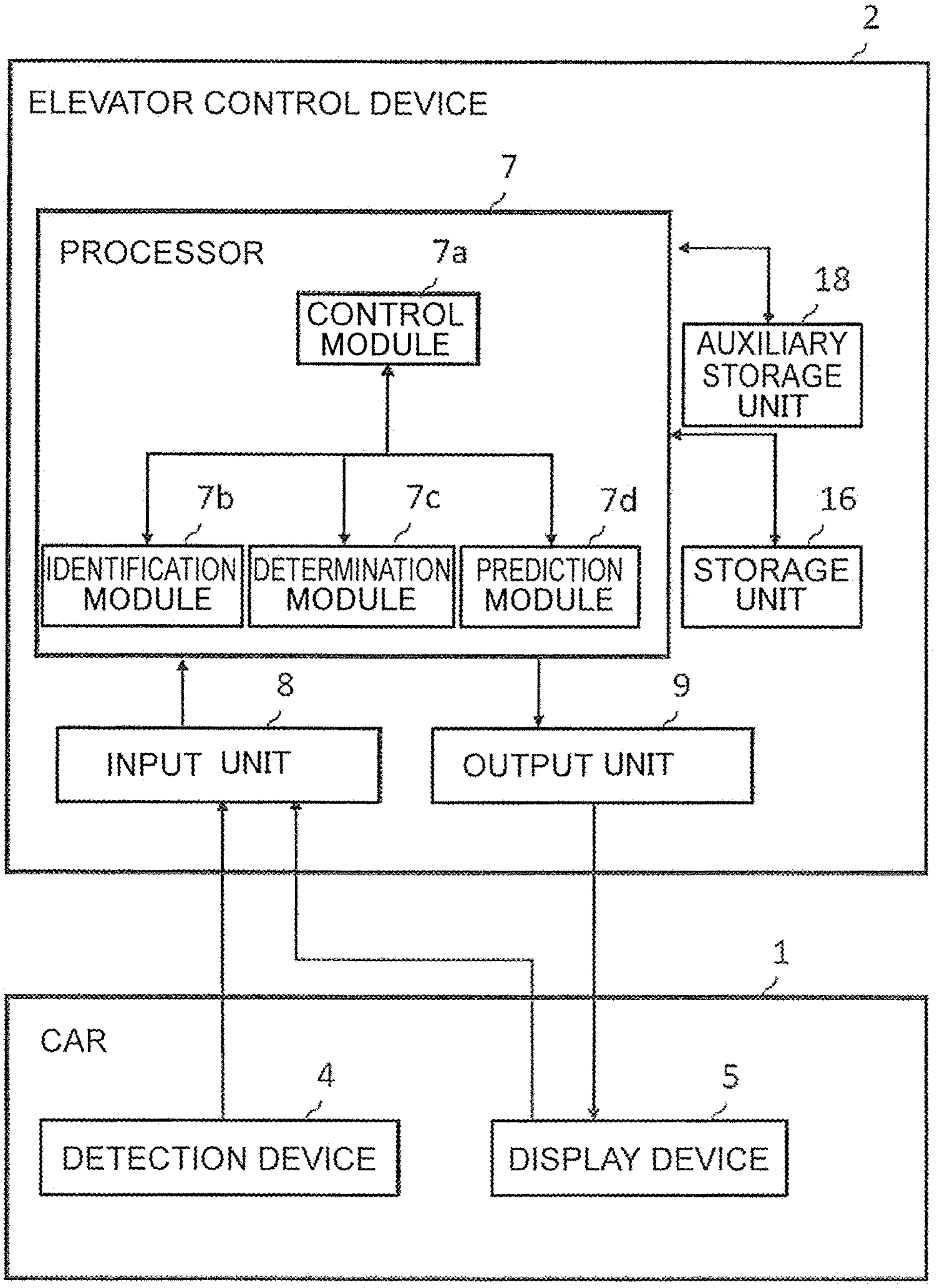
FIG. 18 is a configuration diagram of the elevator device according to the fifth embodiment.

With reference to FIG. 18, description is now given of a configuration of the elevator control device 2 of the elevator device according to this embodiment. The elevator control device 2 includes an auxiliary storage unit 18 being a nonvolatile memory in addition to the configuration in the first embodiment. The auxiliary storage unit 18 includes a database which stores, in advance, an identification number being the identification information for indicating a passenger 6, the face information on the passenger 6, and the MAC address of the portable information terminal held by the passenger 6 associated with one another. The identification number is only required to be stored in association with the face information and the MAC address, and to be capable of distinguishing the passenger 6, and a name of the passenger 6 or the like may be used in place of the identification number.

The identification module 7*b* includes, in addition to a software module configured to acquire feature information being image feature information from the image information detected by the imaging device 4*a*, a software module configured to acquire the MAC address being reception feature information from the management packet received by the reception device 4*b*.

Figure 19:
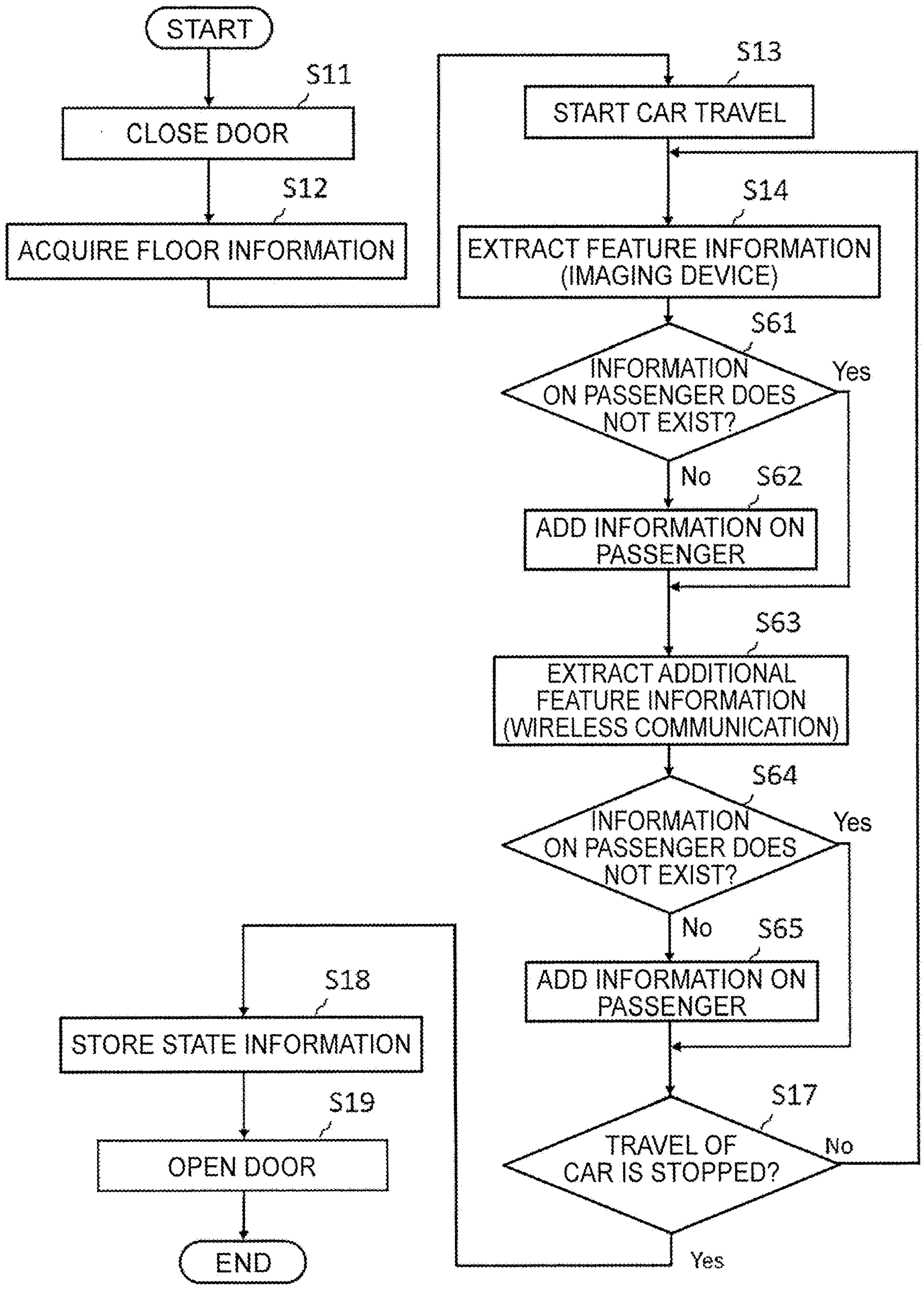
FIG. 19 is a flowchart for illustrating the control at the time when the state information on the elevator device according to the fifth embodiment is stored.

With reference to FIG. 19, an operation of this embodiment is now described. In FIG. 19, the same reference symbols as those of FIG. 4 denote an equivalent or corresponding step. In this embodiment, the same operation as that in the first embodiment is executed from Step S11 to Step S14.

In Step S61, the identification module 7*b* determines whether or not the feature information on the passenger 6 for whom the face information has been extracted in Step S14 has already been acquired. Specifically, the identification module 7*b* collates the face information extracted in Step S14 with the face information stored in the database of the auxiliary storage unit 18, and checks whether or not an identification number of a passenger 6 corresponding to matching face information is stored in the temporary storage destination of the storage unit 16. When the identification number is not stored, the processing proceeds to Step S62. When the identification number is stored, the processing proceeds to Step S63. In Step S62, the identification module 7*b* specifies the identification number of the passenger 6 corresponding to the face information extracted in Step S14 as the information for identifying this passenger, and stores the identification number in the temporary storage destination of the storage unit 16.

After that, in Step S63, the control module 7*a* stores, in the storage unit 16, the management packet transmitted to the input unit 8 by the reception device 4*b*. After that, the control module 7*a* causes the identification module 7*b* to acquire, from the management packet, the MAC address being the additional feature information, and the processing proceeds to Step S64.

In Step S64, the identification module 7*b* determines whether or not the feature information on the passenger 6 corresponding to the acquired MAC address has already been acquired. Specifically, the identification module 7*b* collates the MAC address acquired in Step S63 with the MAC address stored in the auxiliary storage unit 18, and checks whether or not an identification number of a passenger 6 corresponding to matching MAC address is stored in the temporary storage destination of the storage unit 16. When the identification number is not stored, the processing proceeds to Step S65. When the identification number is stored, the processing proceeds to Step S17. In Step S65, the identification module 7*b* specifies the identification number of the passenger 6 corresponding to the acquired MAC address in Step S65 as the information for identifying this passenger, and stores the identification number in the temporary storage destination of the storage unit 16.

After that, the processing proceeds to Step S17, and repeats Step S14, Step S61 to Step S65, and Step S17 as in the first embodiment. Moreover, in the first embodiment, the identification module 7*b* stores, as the identification information 10*c*, the face information stored in the temporary storage destination in the state information database 10. However, in Step S18 in this embodiment, the identification number on the passenger 6 stored in the temporary storage destination is stored as the identification information 10*c* in the state information database 10. After that, the control of acquiring the information on the inside of the car 1 is finished through the same operation as that in the first embodiment.

As described above, when the acquisition of one of the face information or the MAC address is successful, the identification information 10*c* used to determine the leaving can be stored. Thus, even when the face information on a passenger 6 cannot be acquired, the leaving floor can more accurately be determined by supplementarily using the MAC address as the feature information. Moreover, also when a destination floor is to be predicted, the destination floor can accurately be predicted based on the identification number specified from the face information or the identification number specified through the MAC address received by the reception device 4*b*. In this case, in FIG. 6, FIG. 7, and FIG. 11, the identification information is the identification number, and the processor 7 uses the identification number as the identification information to execute the control in the processing of FIG. 5 and FIG. 8.

Sixth Embodiment

In the above-mentioned embodiments, description is given of the examples in which the leaving floor and the like are determined based on the difference in the identification information included in each state information. However, in a sixth embodiment, description is given of an embodiment which specifies a leaving floor not based on the difference, but by updating information on arrival floors of the passengers 6 for each floor.

First, with reference to FIG. 20 to FIG. 22, description is given of an overview of an operation of updating information on the arrival floors. FIG. 20 to FIG. 22 are tables for showing temporary information 15 stored in the storage unit 16. FIG. 20 shows the temporary information 15 at the time when the car 1 travels from the first floor to the second floor. When the passenger A 6*a* indicated by the identification information "A" and the passenger B 6*b* indicated by the identification information "B" are detected in the car, the identification module 7*b* in this embodiment updates the temporary information 15 as shown in FIG. 20. That is, when the passenger A 6*a* and the passenger B 6*b* board the car 1 on the first floor, the identification information and the identification information "B" are stored in the temporary information 15, and floor information corresponding to each piece of identification information is stored as "2." Similarly, FIG. 21 and FIG. 22 show the temporary information 15 at the time when the car 1 travels from the second floor to the third floor, and the temporary information 15 at the time when the car 1 moves from the third floor to the fourth floor, respectively. Specifically, in FIG. 21, when the car 1 travels from the second floor to the third floor, the identification information "B" and the identification information "C" are detected in the car, and hence the identification information "C" is added as the temporary information 15, and pieces of the floor information corresponding to the identification information "B" and the identification information "C" are updated to "3," respectively. Meanwhile, the floor information corresponding to the identification information "A" is not updated, and remains "2." This state indicates a state in which the passenger A 6*a* leaves the car 1 on the second floor, and the passenger C 6*c* indicated by the identification information "C" boards the car 1. FIG. 22 similarly shows a state in which the passenger B 6*b* leaves the car 1 on the third floor, and the passenger C 6*c* travels to the fourth floor without leaving the car 1. After that, when the car 1 arrives at the fourth floor, and finishes the upward operation, the identification information on the passengers 6 and the floors on which these passengers 6 have been finally recognized in the car remain in the temporary information 15.

As described above, in this embodiment, the information on the floors on which passengers 6 are recognized in the car are updated as the car 1 travels, and it is possible to refer to the information on the floors after the update, thereby being capable of specifying the leaving floors of the passengers 6.

Figure 23:
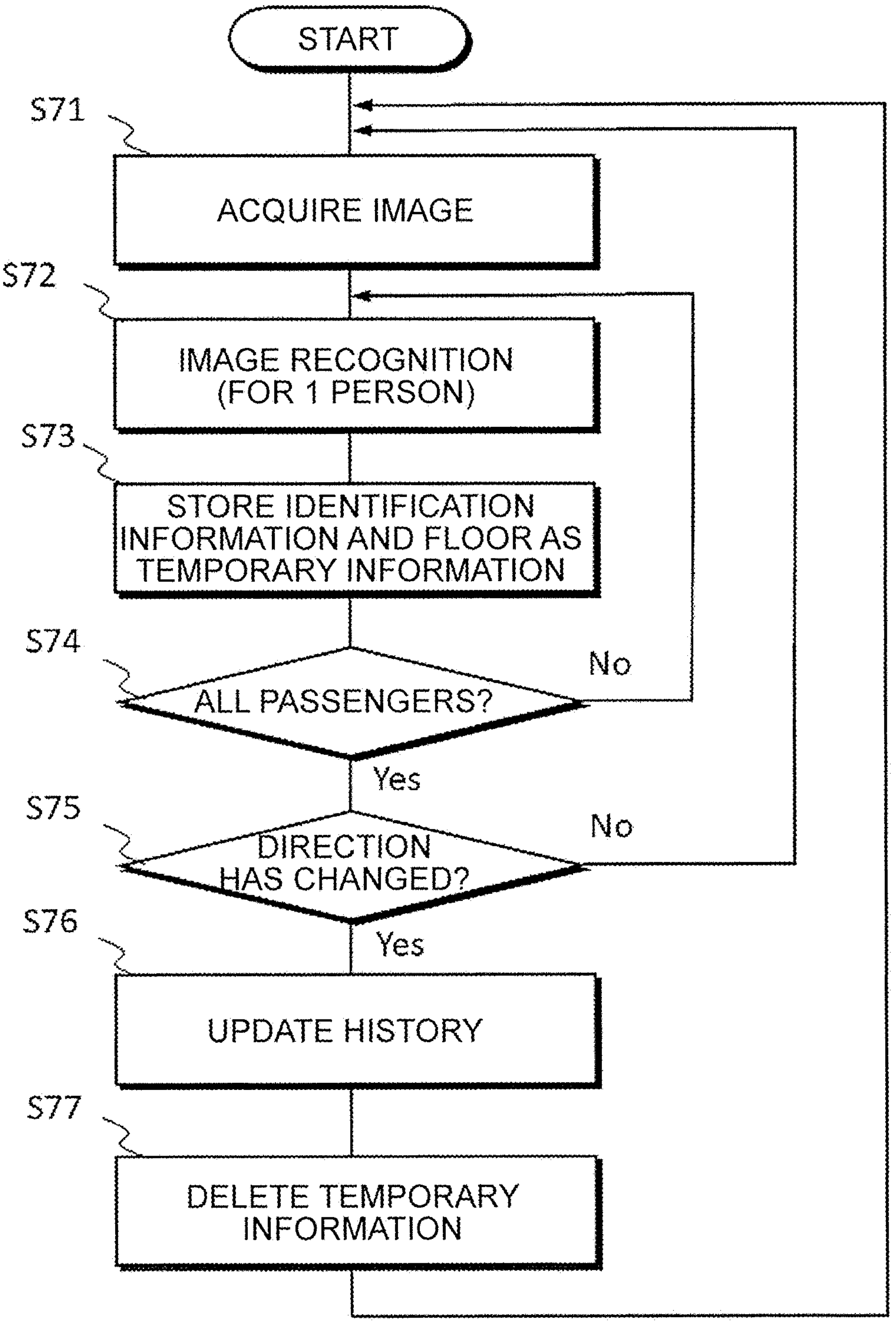
FIG. 23 is a flowchart for illustrating control for the elevator device according to the sixth embodiment.

With reference to FIG. 23, a detailed description is given of an operation of the processor 7 in this embodiment. In Step S71, the identification module 7*b* of the processor 7 acquires the image information taken by the imaging device 4*a* being the detection device 4. On this occasion, the identification module 7*b* extracts, as partial images, images of a plurality of passengers 6 from the image information, and specifies the number of passengers 6.

After that, in Step S72, the identification module 7*b* applies image recognition processing to one of the plurality of extracted images of the passengers 6, to thereby specify the identification information on the passenger 6. The image recognition processing is executed through the same method as that in the above-mentioned embodiments. In this case, the identification information may be the face information or the identification number of the passenger 6. After that, in Step S73, the identification module 7*b* associates the specified identification information and information on a floor at the time when the image has been taken with each other, and stores the associated information in the storage unit 16.

Step S72 and Step S73 are repeated for the number of the passengers through loop processing by way of Step S74. As a result, the same processing is also executed for another passenger B 6*b* in addition to the passenger A 6*a*, and the temporary information 15 is updated as shown in FIG. 20.

After that, in Step S74, the identification module 7*b* determines whether the processing has been applied to the partial images of all of the passengers 6. When a determination of "Yes" is made, the determination module 7*c* determines whether or not the travel direction of the car 1 has changed in Step S75. That is, the determination module 7*c* determines whether or not the travel direction of the car 1 has changed from upward to downward or from downward to upward.

In this case, when the identification module 7*b* makes a determination of "No," the processing returns to Step S71. That is, the same processing as described above is repeated for the passengers 6 in a next travel between floors. For example, it is assumed that, on the second floor, the passenger A 6*a* leaves, the passenger C 6*c* boards, and the car 1 travels upward. In this case, the processing from Step S71 to Step S74 is executed again, and the information is updated as shown in FIG. 21. The identification module 7*b* does not update the floor information on the passenger A 6*a* who has left on the second floor, and updates the information on the passenger B 6*b* from "second floor" to "third floor." Moreover, the identification module 7*b* adds the identification information on the passenger C 6*c* who boards on the second floor and the floor information of "third floor" to the temporary information 15.

When a determination of "Yes" is made in Step S75, the determination module 7*c* uses the information in the temporary information 15 to update the update history stored in storage unit 16 in Step S76. For example, when the passenger B 6*b* leaves on the third floor, the passenger C 6*c* leaves on the fourth floor, and all of the passengers 6 have thus left, the temporary information 15 is updated as shown in FIG. 22 before the execution of the processing in Step S76. In this temporary information 15, the floor information indicates the leaving floor of each passenger 6, and the determination module 7*c* uses the information on the leaving floors of this temporary information 15 to determine the leaving floor of each passenger in Step S76, and updates the history information on the passengers 6 of the summary information database 12 of FIG. 12 as in the first embodiment. Specifically, the determination module 17*c* counts up the numbers of times of leaving in the summary information database 12 corresponding to the identification information and the floor information.

Finally, in Step S77, the determination module 7*c* deletes the information on each passenger 6 described in the temporary information 15, and prepares for the processing for the upward travel or the downward travel caused by a next call at a hall. When the processing in Step S77 is finished, the processing returns to Step S71, and the processor 7 repeats the same processing.

As described above, according to this embodiment, the leaving floors can be specified by updating the arrival floors of the passengers 6 for each floor. The update of the arrival floors is not required to be executed for each floor, and may be executed for each floor on which the car stops. Moreover, in the description given above, the processing characteristic to this embodiment is described in focus, but other processing not described in this embodiment is executed as in other embodiments.

Seventh Embodiment

In a seventh embodiment, the determination of the leaving floor and the like is executed by a method different from those in the above-mentioned embodiments. Specifically, the method used in this embodiment is a method of specifying the boarding floors or the leaving floors of the passengers 6 by detecting passengers 6 in the hall, that is, on the floor 3 through use of the detection device 4 installed in the car 1.

Figure 24:
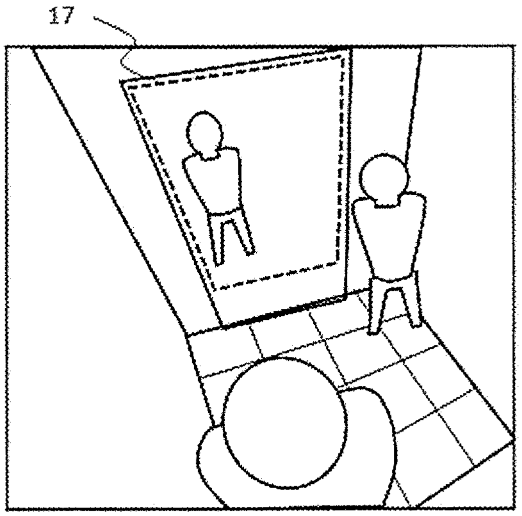
FIG. 24 is a view for illustrating an image of a monitor camera in a seventh embodiment of this disclosure.

FIG. 24 is a view for illustrating an image taken by the imaging device 4*a* being the detection device 4 installed in the car 1. This image is an image taken in a state in which the hall can be viewed through an entrance of the car 1. The identification module 7*b* in this embodiment recognizes an image of passengers 6 included in a region 17 indicated by broken lines of FIG. 24, and the determination module 7*c* specifies passengers 6 who board and passengers 6 who leave on this floor based on a result of this recognition. Images of the passengers 6 used for the collation of the image recognition include an image of a front view and an image of a rear view of each passenger 6. These images for the collation are stored in the storage unit 16 or the auxiliary storage unit 18.

When an image matching the image of the front view of a passenger 6 is included in the region 17, the determination module 7*c* recognizes a floor on which this image is taken as a boarding floor of this passenger 6. Moreover, when an image matching the image of the rear view of a passenger 6 is included in the region 17, the determination module 7*c* recognizes a floor on which this image is taken as a leaving floor of this passenger 6.

Figure 25:
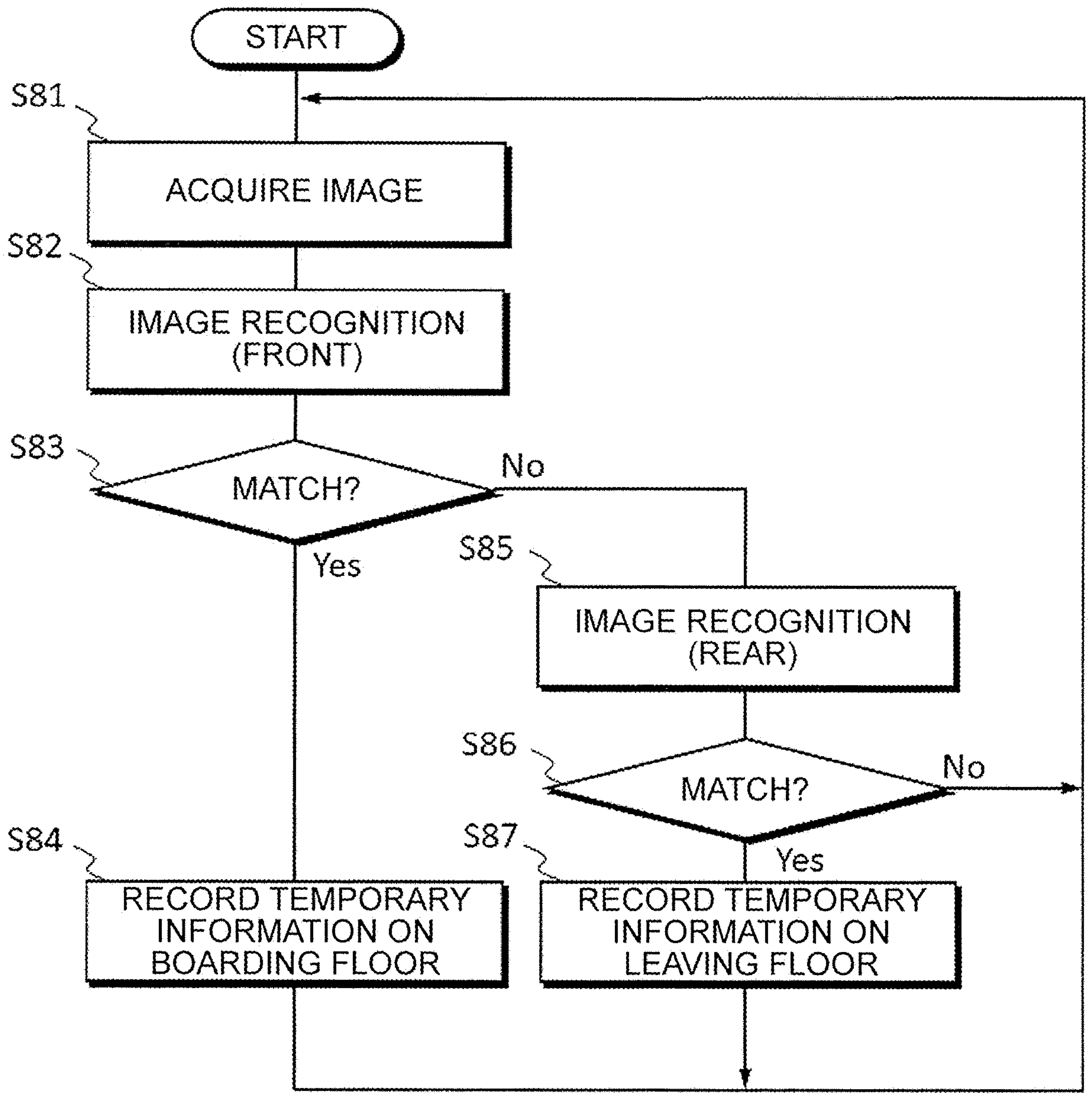
FIG. 25 is a flowchart for illustrating control for the elevator device according to the seventh embodiment.

With reference to FIG. 25, a detailed description is now given of an operation of the processor 7. In Step S81, the identification module 7*b* of the processor 7 extracts an image of the hall viewed through the entrance from the image taken by the imaging device 4*a*. Specifically, the identification module 7*b* extracts an image in a region surrounded by a certain number of coordinate points from the image. The imaging device 4*a* is fixed to the car, and hence the above-mentioned coordinate points are fixed. Accordingly, the identification module 7*b* reads the coordinates set to the storage unit 16 in advance, thereby being capable of specifying these coordinate points. After that, the identification module 7*b* extracts an image of a passenger 6 included in the extracted image as the partial image.

After that, in Step S82, the identification module 7*b* uses the same algorithm as that in the first embodiment for this partial image to execute the recognition processing for the passenger 6, that is, pattern matching processing between the acquired partial image and the image for the collation. In this case, the identification module 7*b* uses the image of the front view of the passenger 6 as the image for the collation to execute the recognition processing. After that, the identification module 7*b* outputs identification information on the passenger 6 as a recognition result. In this case, the identification information may be face information or the identification number of the passenger 6 corresponding to the image for the collation. When the identification module 7*b* cannot identify the passenger 6, the identification module 7*b* outputs, as the recognition result, information indicating no matching.

In Step S83, the determination module 7*c* determines whether or not an image matching the image of the front view of the passenger 6 is detected in Step 82 based on the recognition result of the identification module 7*b*. Specifically, the determination module 7*c* determines whether or not a matching image is detected based on whether the identification information on the passenger 6 is output or the information indicating no matching is output in Step S82. When the determination is "Yes," the determination module 7*c* stores information on the boarding floor in the confirmation information database 11 of FIG. 11 of the storage unit 16 in Step S84. That is, the determination module 7*c* stores, in the storage unit 16, the identification information on the passenger 6 corresponding to the image for the collation and the boarding of this passenger 6 on the floor on which the image is taken associated with each other. After that, the processing returns to Step S81, and the processor 7 repeats the above-mentioned processing.

When the determination module 7*c* makes a determination of "No" in Step S83, the identification module 7*b* uses the image for the collation and the image of the rear view of the passenger 6 to execute the recognition processing as in Step S82 in Step S85. After that, in Step S86, the determination module 7*c* uses the recognition result of the identification module 7*b* to determine whether or not there exists an image for the collation which matches the partial image of the imaging device 4*a*. When the determination is "Yes," the determination module 7*c* stores information on the leaving floor in the confirmation information database 11 of the storage unit 16 in Step S89. That is, the determination module 7*c* stores, in the storage unit 16, the identification information on the passenger 6 corresponding to the image for the collation and the leaving of this passenger 6 on the floor on which the image is taken associated with each other. After that, the processing returns to Step S81, and the processor 7 repeats the above-mentioned processing. When a determination of "No" is made in Step S86, the determination module 7*c* does not update the confirmation information database 11, and the processing returns to Step S81.

As described above, according to this embodiment, the leaving floor of the passenger 6 and the like can be determined without depending on the difference in the identification information or the update of the identification information on each floor. The information for the collation in the recognition processing is not limited to the image, and any information enabling the recognition of the image such as a feature quantity vector extracted from the image may be used. Moreover, in the description given above, the processing characteristic to this embodiment is described in focus, but other processing not described in this embodiment is executed as in other embodiments.

Eighth Embodiment

An eighth embodiment enables cancelation of a candidate floor 13 and a destination floor through an operation by a passenger 6. Description is now mainly given of a different point from the first embodiment.

First, with reference to FIG. 2, a configuration in this embodiment is described. The control module 7*a* includes a software module which cancels, when a state in which a button corresponding to a candidate floor 13 or a destination floor and a close button are simultaneously pressed is input from the button-type destination navigation device 5*a* being the display device 5 through the input unit 8, the registration of the candidate floor 13 or the destination floor.

Figure 26:
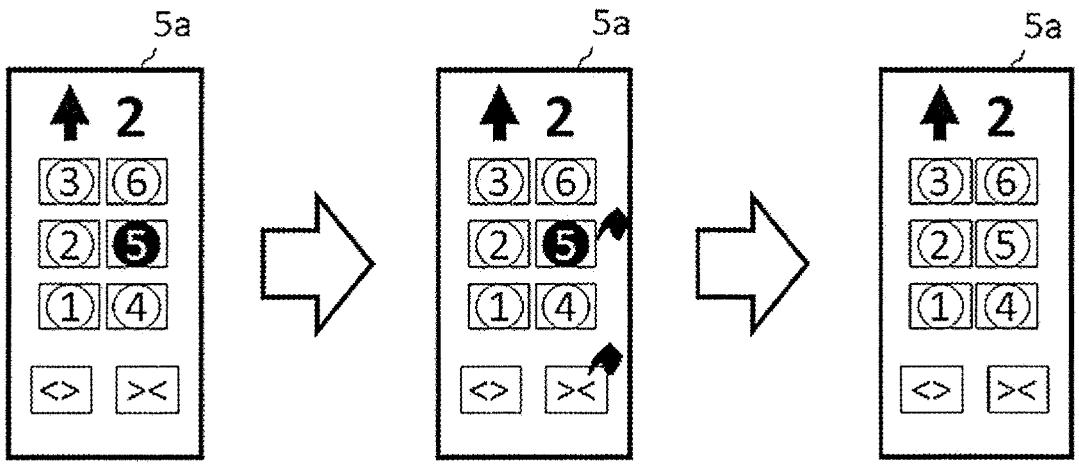
FIG. 26 is a view for illustrating the button-type destination navigation device at the time when a destination floor deletion operation is executed in an eighth embodiment of this disclosure.

With reference to FIG. 26, an operation in this embodiment is now described. FIG. 26 is a view for illustrating a display example of the button-type destination navigation device 5*a* at the time when a destination floor is canceled by a passenger 6. A left view of FIG. 26 is a display example of the button-type destination navigation device 5*a* in which the fifth floor 3*e* is registered as the destination floor. In a center view of FIG. 26, there is illustrated a state in which a button corresponding to the fifth floor 3*e* and the close button are simultaneously input. In a right view of FIG. 26, there is illustrated a state in which the button corresponding to the fifth floor 3*e* is turned off, and the registration as the destination floor is canceled.

As described above, even when a floor to which a passenger 6 does not want to travel is registered as a candidate floor 13 or a destination floor, the registration can be canceled.

Ninth Embodiment

A ninth embodiment uses a touch-panel-type destination navigation device 5*b* as the display device 5 in place of the button-type destination navigation device 5*a* in the first embodiment. Description is now mainly given of a different point from the first embodiment.

Figure 27:
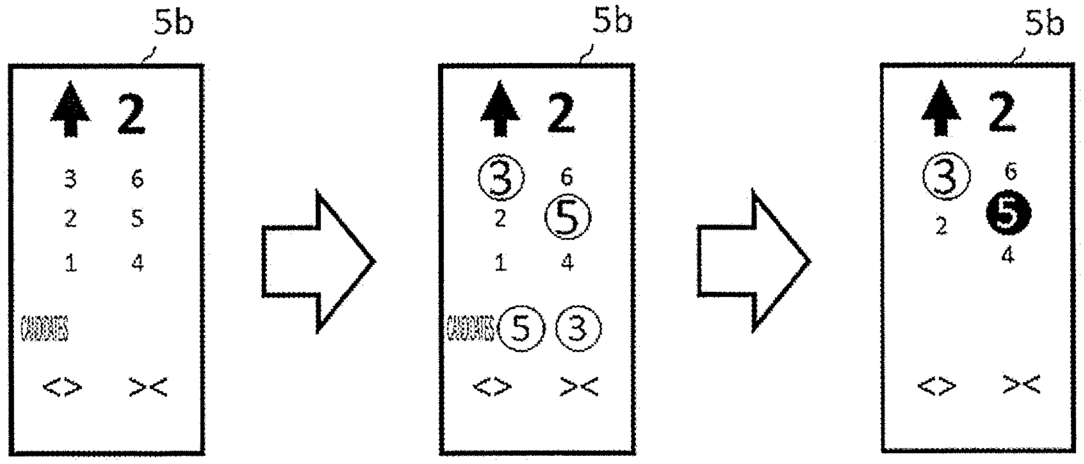
FIG. 27 is a view for illustrating a touch-panel-type destination navigation device at the time when a plurality of passengers are aboard in a ninth embodiment of this disclosure.

With reference to FIG. 27, a configuration and an operation of this embodiment are described. FIG. 27 is a view for illustrating a display example of the touch-panel-type destination navigation device 5*b* at the time when the same operation as that of FIG. 10 in the first embodiment is executed. This device can display an image through use of a liquid crystal display device or an organic electroluminescence display device, and buttons are displayed as images on a display screen. The control module 7*a* controls the touch-panel-type destination navigation device 5*b* to execute control of changing display contents as illustrated in FIG. 27. In a center view of FIG. 27, there is illustrated a state in which, when the third floor 3*c* and the fifth floor 3*e* are predicted as candidate floors 13, corresponding displays are enlarged and highlighted. Further, at a lower portion of the touch panel, the candidate floors are displayed. After that, when the fifth floor 3*e* is registered as the destination floor, the display corresponding to the fifth floor 3*e* is changed to a reversed display as illustrated in a right view of FIG. 27, and the display indicating the third floor 3, which is not present on the travel direction, is hidden. In this state, the hiding includes graying in addition to the hiding.

As described above, also when the touch-panel-type destination navigation device 5*b* is used, the same effects as those in the first embodiment can be obtained.

Tenth Embodiment

A tenth embodiment uses a projection-type destination navigation device 5*d* as the display device 5 in place of the button-type destination navigation device 5*a* in the first embodiment. Description is now mainly given of a different point from the first embodiment.

Figure 28:
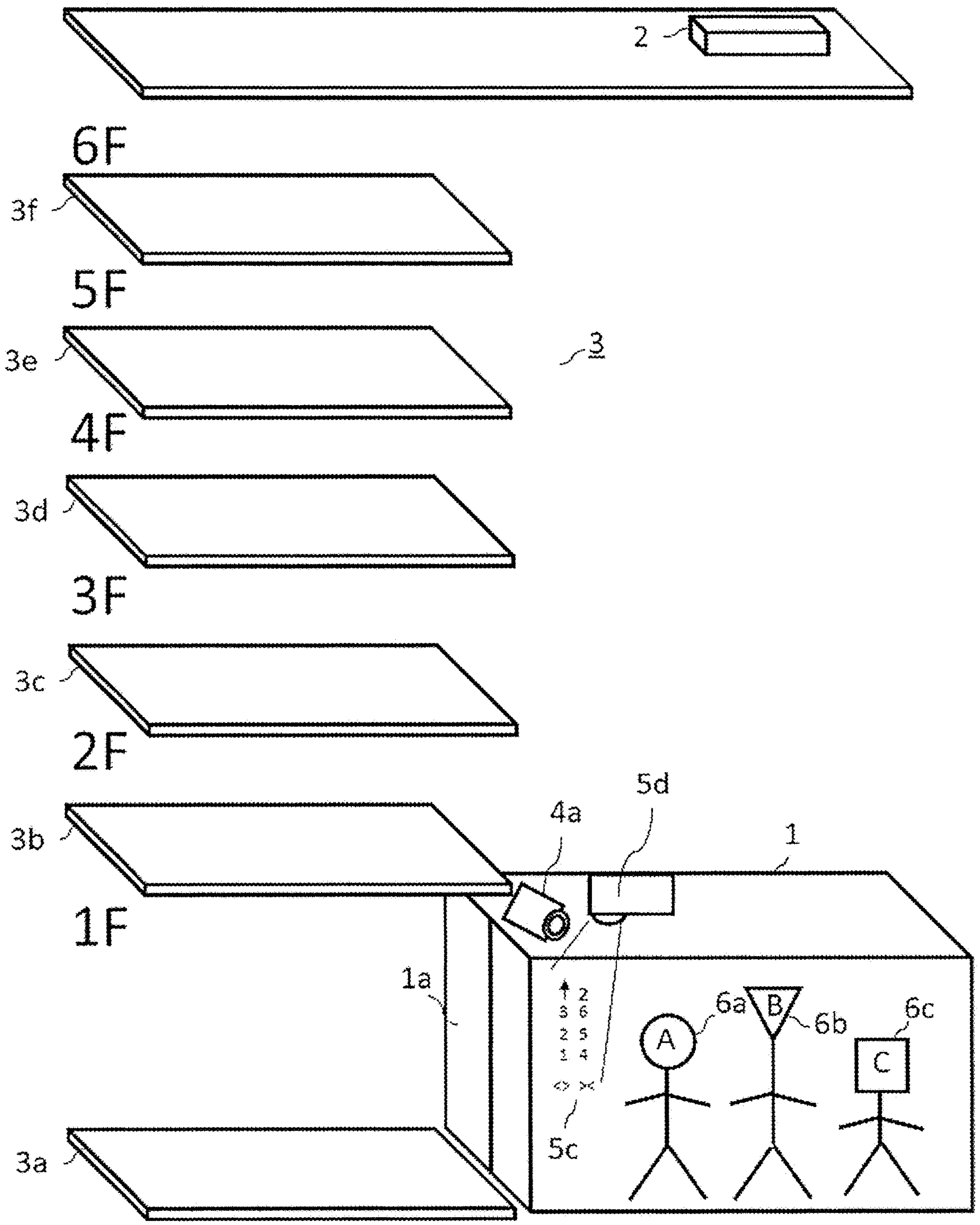
FIG. 28 is a diagram for illustrating the elevator device according to a tenth embodiment of this disclosure.

First, with reference to FIG. 28, description is given of a configuration of the elevator device according to this embodiment. In FIG. 28, the same reference symbols as those of FIG. 1 denote an equivalent or corresponding part. In this embodiment, in place of the button-type destination navigation device 5*a* in the first embodiment, the projection-type destination navigation device 5*d* such as a projector is installed in an upper portion on a left side as viewed from the door 1*a* toward the inside of the car 1. The projection-type destination navigation device 5*d* projects a navigation image 5*c* toward a position at which the button-type destination navigation device 5*a* is installed in the first embodiment.

The projection-type destination navigation device 5*d* includes an imaging device, and also serves as a sensor which senses input by a passenger 6. Specifically, when a passenger 6 holds a hand over a portion indicating floors 3 of the navigation image 5*c* or a portion indicating the opening and the closing of the door 1*a* thereof, the projection-type destination navigation device 5*d* senses the input by the passenger 6.

Figure 29:
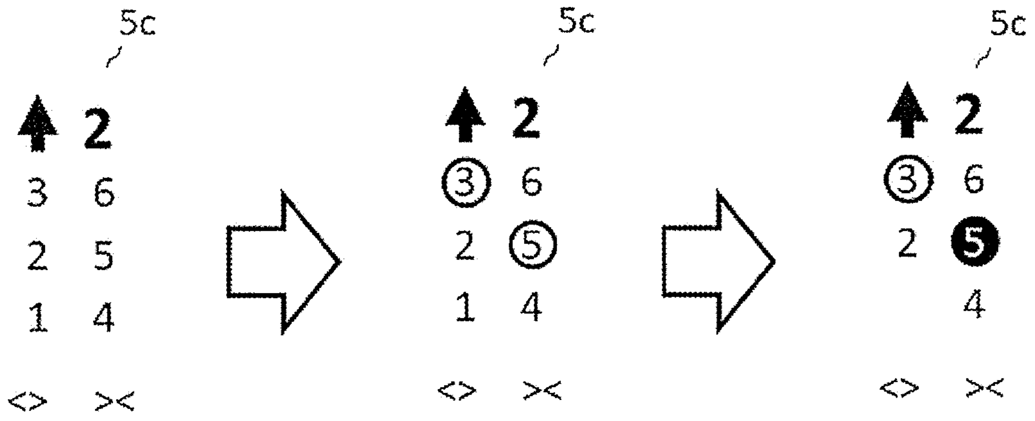
FIG. 29 is a view for illustrating a navigation image at the time when a plurality of passengers are aboard in the tenth embodiment.

With reference to FIG. 29, an operation in this embodiment is described. FIG. 29 is a view for illustrating a display example of the navigation image at the time when the same operation as that of FIG. 10 in the first embodiment is executed. In a center view of FIG. 29, the third floor 3*c* and the fifth floor 3*e* are predicted as candidate floors 13, and corresponding displays are highlighted. After that, when the fifth floor 3*e* is registered as the destination floor, the display corresponding to the fifth floor 3*e* is changed to a reversed display, and the display indicating the third floor 3, which is not present on the travel direction, is hidden.

As described above, also when the projection-type destination navigation device 5*d* is used, the same effects as those in the first embodiment can be obtained.

Eleventh Embodiment

An eleventh embodiment stops the blinking display of a candidate floor 13 displayed on the button-type destination navigation device 5*a* when a passenger 6 presses a button for a destination floor that is not the candidate floor 13. Description is now mainly given of a different point from the first embodiment.

First, with reference to FIG. 2, a configuration in this embodiment is described. The identification module 7*b* includes a software module which specifies, when the button for the destination floor of the button-type destination navigation device 5*a* being the display device 5 is pressed, a passenger 6 who has pressed this button.

In the first embodiment, the control module 7*a* executes the control of outputting the signal of causing the button-type destination navigation device 5*a* to display, in the blinking manner, a candidate floor 13 of a passenger 6 predicted by the prediction module 7*d*, starting the timer simultaneously with the output of the candidate floor 13, and registering the candidate floor 13 as the destination floor when a certain period has elapsed. In this embodiment, the control module 7*a* includes a software module which outputs, when the identification module 7*b* specifies a passenger 6 who has pressed a button, a signal for stopping the blinking display of the destination floor 13 of this passenger 6. Moreover, the control module 7*a* also includes a software module which stops the timer corresponding to the candidate floor 13 the blinking display of which is stopped.

An operation of this embodiment is now described. In the first embodiment, the timer started simultaneously with the output of the candidate floor 13 in Step S35 of FIG. 8 is started for each floor 3, but the timer is provided for each passenger 6 in this embodiment. In Step S35, the control module 7*a* stores correspondence among the face information on a passenger 6, the candidate floor 13 of the passenger 6, and the timer in the temporary storage destination simultaneously with the output of the candidate floor 13 and the start of the timer.

Figure 30:
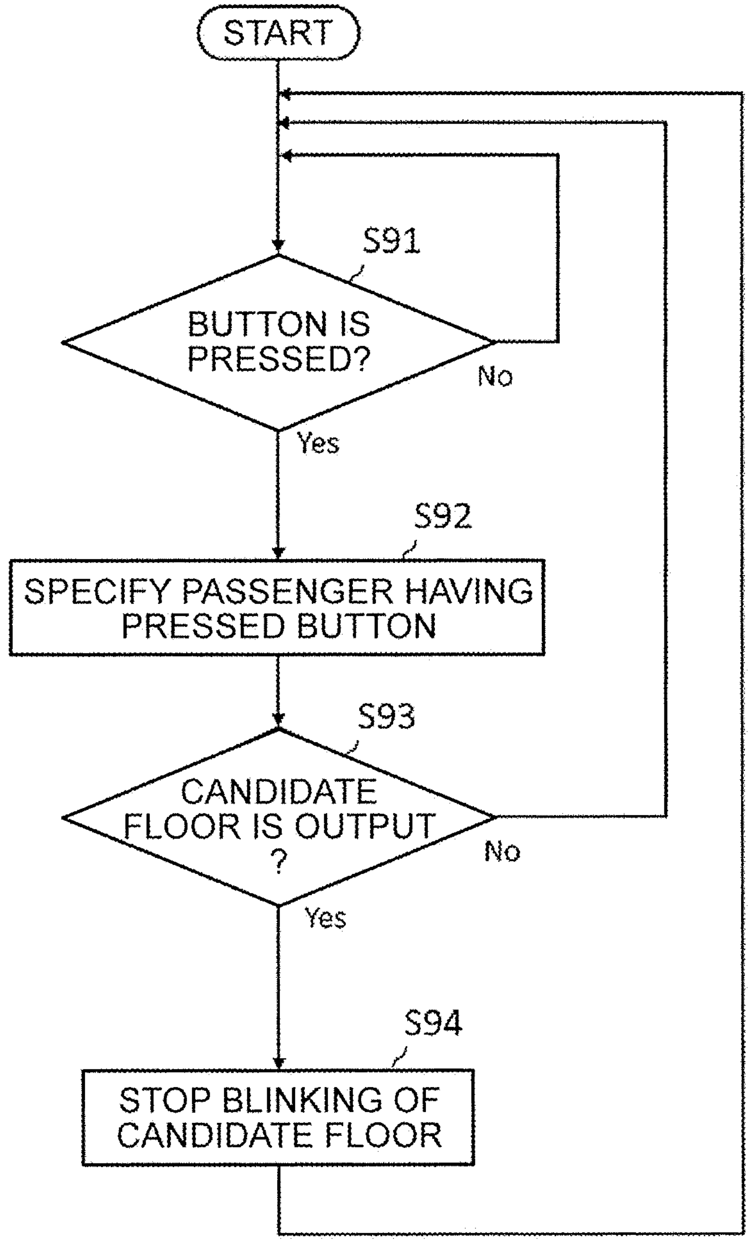
FIG. 30 is a flowchart for illustrating control at the time when display of a destination floor candidate of the elevator device according to an eleventh embodiment of this disclosure is stopped.

With reference to FIG. 30, description is now given of control for the elevator device when the display of the destination floor candidates is stopped. In Step S91, the control module 7*a* waits for pressing of the button of the button-type destination navigation device 5*a* by a passenger 6. When the control module 7*a* determines that the signal indicating the pressing of the button for the destination floor is input from the button-type destination navigation device 5*a* into the input unit 8, the processing proceeds to Step S92.

In Step S92, the identification module 7*b* specifies the passenger 6 who has pressed the button. For example, face information on a passenger 6 closest to the button-type destination navigation device 5*a* is extracted through the same method as that in Step S14 of FIG. 4. After that, the processing proceeds to Step S93.

In Step S93, the control module 7*a* checks whether or not the candidate floor 13 of the passenger 6 specified in Step S92 has already been output. Specifically, the face information on the passenger 6 extracted by the identification module 7*b* is collated with the face information stored in the temporary storage destination in Step S35 through the two-dimensional face recognition. When there exists matching face information, the processing proceeds to Step S94. When there does not exist matching face information, the processing returns to Step S91.

In Step S94, the control module 7*a* refers to the temporary storage destination, outputs, from the output unit 9, the signal for stopping the blinking display of the candidate floor 13 of the passenger 6 specified in Step S92, and stops the timer. After that, the correspondence among the face information on the passenger 6, the candidate floor 13 of this passenger 6, and the timer is deleted from the temporary storage destination. After that, the processing returns to Step S91, and repeats this operation.

As described above, when a passenger 6 selects a floor 3 other than the candidate floor 13 as a destination floor, there is eliminated such a case that the candidate floor 13 is automatically registered as a destination floor. As a result, convenience of the elevator device increases.

Although the present invention has been described with reference to the embodiments, the present invention is not limited to these embodiments. Description is now given of modification examples of the configuration.

In the description of the embodiments, the elevator control device 2 is illustrated at a position above a hoistway, but the installation position of the elevator control device 2 is not limited to this example. For example, the elevator control device 2 may be installed on a ceiling (upper portion) or a lower portion of the car 1, or in the hoistway. Moreover, the elevator control device 2 may be provided independently of a control device which controls the entire elevator device, and may be connected to the control device through wireless communication or wired communication. For example, the elevator control device 2 may be provided inside a monitoring device which monitors an entire building.

In the embodiments, the detection device 4 is the imaging device 4*a* or the reception device 4*b*. However, the detection device 4 may be any device as long as the identification module 7*b* detects information which can identify passengers 6 in the car 1, and may be, for example, a pressure sensor when the identification module 7*b* identifies the passengers 6 based on weights thereof.

In the embodiments, the imaging device 4*a* takes images in one direction, but the imaging device 4*a* may be any device which is installed inside the car 1, and can take an image of the inside of the car 1. For example, the imaging device 4*a* may be installed on the ceiling of the car 1, and may take an image of the entire car 1 through a fisheye lens.

In the embodiments, the input unit 8 and the output unit 9 are the interfaces including the terminals connected to other devices through the electric wires (not shown), but the input unit 8 and the output unit 9 may be a reception device and a transmission device connected to other devices through wireless communication, respectively.

In the embodiments, the control module 7*a*, the identification module 7*b*, the determination module 7*c*, and the prediction module 7*d* are software modules provided to the processor 7, but may be hardware having the respective functions.

In the embodiments, the storage unit 16 and the auxiliary storage unit 18 are provided inside the elevator control device 2, but may be provided inside the processor 7 or outside the elevator control device 2. Moreover, in the embodiments, the nonvolatile memory stores the databases, and the volatile memory temporarily stores the information generated through the processing of the processor 7 and the like, but the correspondence between the types of memory and the type of stored information is not limited to this example. Further, a plurality of elevator control devices 2 may share the same storage unit 16 and the auxiliary storage unit 18, or may use a cloud as the storage unit 16 and the auxiliary storage unit 18. Further, the various types of databases stored in the storage unit 16 may be shared among a plurality of elevator devices. For example, histories of leaving of elevator devices installed on a north side and a south side of a certain building may be shared. Moreover, the storage unit 16 and the auxiliary storage unit 18 may be provided in one storage device.

In the embodiments, the identification information is described mainly using the face information, but the identification information is changed based on the performance of the elevator control device 2 and the detection device 4 for detecting passengers 6 and a required degree of identification. For example, when the detection device 4 and the elevator control device 2 having a high performance are used to be capable of identifying a passenger 6 from a hair style, information on the hair style may be used as the identification information, and a part of the face information (partial features of a face such as an iris of an eye, a nose, and an ear) may be the identification information. Moreover, when it is only required to distinguish an adult and a child from each other, information on a body height may be used as the identification information.

Moreover, when the reception device 4*b* is used as the detection device 4 in the fifth embodiment, the MAC address is used as the feature information, but other information uniquely defined for a device held by a passenger 6, for example, another address on a physical layer, or a name of a subscriber or a terminal information on a cellular phone being the transmission device 4*c* may be used as the feature information or the identification information in place of the MAC address.

Description is now given of modification examples of the operation.

The feature information is acquired during the travel of the car 1 in the first embodiment, but it is only required to acquire the feature information on the passengers 6 aboard the car 1 in the period from the door closing to the door opening of the car 1. For example, in Step S11, the acquisition of the feature information in Step S14 may be executed in a period from the door closing in Step S11 to the start of the travel of the car 1 in Step S13. The acquisition of the identification information may be repeated in a period from the closing of the door 1*a* at such a degree that a person cannot pass in Step S11 to the opening of the door 1*a* at such a degree that a person can pass in Step S19.

In the embodiments, the identification module 7*b* extracts feature points through the calculation each time the feature information is extracted in Step S14, but the feature extraction may be executed through a publicly known AI technology such as deep learning. As the publicly known technology, for example, there are an alignment method for a face image, a method for extracting a feature representation through use of a neural network, and a method for identifying a person described in Yaniv Taigman, Ming Yang, Marc'Arelio Ranzato, and Lior Wolf, "DeepFace: Closing the Gap to Human-Level Performance in Face Verification," in CVPR, 2014.6.

In the embodiments, the prediction module 7*d* uses all of the histories of leaving stored in the summary information database 12 to predict a candidate floor 13, but the histories of leaving to be used may appropriately be set. For example, a history of leaving in the last one month may be used. Moreover, old histories may be deleted.

In the fifth embodiment, the reception device 4*b* detects the management packet which the transmission device 4*c* continues to periodically transmit, but a subject to the detection is only required to be what the transmission device 4*c* transmits, and is not required to be what the transmission device 4*c* continues to transmit. For example, a channel quality indicator (CQI) which a cellular phone being the transmission device 4*c* continues to transmit may be received, and when a nearest neighbor ratio is detected, the transmission device 4*c* may be instructed to transmit the terminal information, and the terminal information may be received.

In the third embodiment, the fourth embodiment, and the fifth embodiment, when one or more of the two types of the feature information are acquired by the identification module 7*b*, the state information is stored in the state information database 10. As a result, when one or more of the two types of feature information on the same passenger 6 is acquired by the identification module 7*b*, the determination module 7*c* considers that the passenger 6 is aboard the car 1, and makes the determination for a leaving floor, but the number of types of feature information may be two or more.

In the embodiments, the display device 5 highlights the candidate floors 13 and the destination floor through lighting, blinking, enlarging, or reversing, but the method of the highlighting is not limited to these examples, and the highlighting may be executed by changing a color, increasing brightness, and the like.

In the eighth embodiment, the cancelation of the candidate floors 13 and the destination floor is executed by simultaneously pressing the corresponding button and the close button, but the method is not limited to this example. For example, the cancelation may be executed by simultaneously pressing the corresponding button and the open button. Moreover, the cancelation may be executed by repeatedly pressing the corresponding button for a plurality of times, or the cancelation may be executed by pressing and holding the corresponding button. Further, the registration of the destination floor may be changed by simultaneously pressing a button corresponding to the candidate floor 13 or the destination floor and a button corresponding to a floor 3 which a passenger 6 intends to register as the destination floor.

In the tenth embodiment, the projection-type destination navigation device 5*d* projects the navigation image 5*c* toward the position at which the button-type destination navigation device 5*a* is installed in the first embodiment. The projection-type destination navigation device 5*d* may be replaced by a display device which displays an image in the air.

REFERENCE SIGNS LIST

1 car, 2 elevator control device, 3 floor, 3*a* first floor, 3*b* second floor, 3*c* third floor, 3*d* fourth floor, 3*e* fifth floor, 3*f* sixth floor, 4 detection device, 4*a* imaging device, 4*b* reception device, 4*c* transmission device, 5 display device, 5*a* button-type destination navigation device, 5*b* touch-panel-type destination navigation device, 5*c* navigation image, 5*d* projection-type destination navigation device, 6 passenger, 6*a* passenger A, 6*b* passenger B, 6*c* passenger C, 7 processor, 7*a* control module, 7*b* identification module, 7*c* determination module, 7*d* prediction module, 8 input unit, 9 output unit, 10 state information database, 10*a* state number, 10*b* departure floor information, 10*c* identification information, 10*d* travel direction information, 11 confirmation information database, 11*a* confirmation number, 11*b* leaving floor information, 11*c* passenger information, 11*d* direction information, 11*e* boarding/leaving information, 12 summary information database, 13 candidate floor, 14 correspondence table, 14*a* correspondence number, 14*b* face information, 14*c* feature information, 14*d* coordinate information, 15 temporary information, 16 storage unit, 17 region, 18 auxiliary storage unit, 19 confirmation information database, 20 correspondence table

The invention claimed is:

1. An elevator device, comprising:

a detection device disposed in an interior of a car of an elevator;

processing circuitry configured as an identification module configured to repeatedly acquire, at different times, identification information for identifying a passenger from detection information detected at the different times by the detection device disposed in the interior of the car, wherein the processing circuitry is further configured as a determination module configured to determine a leaving floor of the passenger based on a change in the identification information acquired by the identification module and a floor on which the car stops, wherein the different times include:

a time in a first state from door closing to door opening including a travel of the car; and a time in a second state from the door closing to the door opening including a travel of the car subsequent to the first state, wherein the determination module is configured to determine the leaving floor through use of a difference in the identification information acquired by the identification module in the first state and in the second state, and a floor on which the travel of the car starts in the second state, and wherein the identification module acquires the identification information exclusively from the detection device disposed in the interior of the car.

2. The elevator device according to claim 1, wherein the identification module is configured to extract two or more types of feature information on the same passenger from the detection information detected by the detection device, and when the identification module determines that one or more types of the feature information of the two or more types of the feature information are information indicating a certain passenger, the identification module specifies the information for identifying the passenger as the identification information.

3. The elevator device according to claim 2, wherein the detection device is an imaging device, and wherein the two or more types of the feature information is two or more types of feature information on the passenger acquired from image information taken by the imaging device, and at least one of the two or more types of the feature information include face information on the passenger.

4. The elevator device according to claim 3, wherein the imaging device is installed so as to take an image of a door side of the car, wherein at least one of the two or more types of the feature information include feature information on a rear view of the passenger, and wherein the identification module is configured to identify the passenger through use of the feature information on the rear view and specifies the information capable of identifying the passenger as the identification information.

5. The elevator device according to claim 2, wherein the detection device is an imaging device, wherein the two or more types of feature information include coordinate information on the passenger acquired from the image information taken by the imaging device, and wherein the identification module is configured to:

identify the passenger by repeatedly acquiring the coordinate information for a plurality of times;

compare the coordinate information acquired for a current time and the coordinate information acquired for a previous or earlier time with each other, and specify the information for identifying the passenger as the identification information.

6. The elevator device according to claim 2, wherein the detection device includes an imaging device and a reception device configured to receive information transmitted from a transmission device for wireless communication, and wherein the two or more types of feature information include image feature information for identifying the passenger which is acquired by the identification module from image information taken by the imaging device and reception feature information acquired by the identification module from information received by the reception device, wherein the elevator device further comprises an auxiliary storage unit including a memory and configured to store the image feature information, the reception feature information, and the identification information associated with one another, and wherein, when the identification module refers to the auxiliary storage unit, and detects one of the image feature information or the reception feature information stored in association with each other, the identification module is configured to specify the identification information corresponding to the detected information as the identification information on the passenger.

7. The elevator device according to claim 1, further comprising a storage unit including a memory and configured to store the leaving floor determined by the determination module as a history of leaving in association with the identification information on the passenger.

8. The elevator device according to claim 7, wherein the determination module is configured to determine a boarding floor of the passenger based on the change in the identification information acquired by the identification module and the floor on which the car stops, and wherein the storage unit is configured to store the boarding floor determined by the determination module in association with the history of leaving.

9. The elevator device according to claim 7, wherein the processing circuitry is further configured as a prediction module configured to predict a candidate of a destination floor based on the history of leaving associated with the identification information when the detection device detects the identification information.

10. The elevator device according to claim 9, further comprising:

a display device provided to the car; and the processing circuitry is further configured as a control module configured to cause the display device to display the candidate of the destination floor of the passenger.

11. The elevator device according to claim 9, wherein the prediction module is configured to predict the candidate of the destination floor of the passenger in accordance with the number of times of the history of leaving.

12. The elevator device according to claim 3, further comprising a storage unit including a memory and configured to store the leaving floor determined by the determination module as a history of leaving in association with the identification information on the passenger.

13. The elevator device according to claim 4, further comprising a storage unit including a memory and configured to store the leaving floor determined by the determination module as a history of leaving in association with the identification information on the passenger.

14. The elevator device according to claim 6, further comprising a storage unit including a memory and configured to store the leaving floor determined by the determination module as a history of leaving in association with the identification information on the passenger.

15. The elevator device according to claim 8, wherein the processing circuitry is further configured as a prediction module configured to predict a candidate of a destination floor based on the history of leaving associated with the identification information when the detection device detects the identification information.

16. The elevator device according to claim 10, wherein the prediction module is configured to predict the candidate of the destination floor of the passenger in accordance with the number of times of the history of leaving.

17. The elevator device according to claim 1, wherein the processing circuitry is configured to first output a command to close a door of the elevator car and then repeatedly acquire the identification information for identifying the passenger from the detection information detected by the detection device.

18. The elevator device according to claim 17, wherein the processing circuitry, configured as the identification module, is configured to:

apply a Sobel filter to the acquired image information to execute edge pixel detection, and then calculate feature quantities, and the feature quantities include a brightness distribution of edge pixels.

19. An elevator control device, comprising:

processing circuitry configured as an identification module configured to repeatedly acquire, at different times, identification information for identifying a passenger from detection information on an inside of a car of an elevator detected at the different times by a detection device provided inside the car, wherein the processing circuitry is further configured as a determination module configured to determine a leaving floor of the passenger based on a change in the identification information acquired by the identification module and a floor on which the car stops, wherein the different times include:

a time in a first state from door closing to door opening including a travel of the car; and a time in a second state from the door closing to the door opening including a travel of the car subsequent to the first state, wherein the determination module is configured to determine the leaving floor through use of a difference in the identification information acquired by the identification module in the first state and in the second state, and a floor on which the travel of the car starts in the second state, and wherein the identification module acquires the identification information exclusively from the detection device provided inside the car.

* * * * *